(12) United States Patent
Lee et al.

(10) Patent No.: US 11,902,962 B2
(45) Date of Patent: *Feb. 13, 2024

(54) METHOD AND DEVICE FOR PERFORMING SL DRX OPERATION ON BASIS OF HARQ FEEDBACK IN NR V2X

(71) Applicant: LG ELECTRONICS INC., Seoul (KR)

(72) Inventors: Seungmin Lee, Seoul (KR); Hanbyul Seo, Seoul (KR); Giwon Park, Seoul (KR)

(73) Assignee: LG ELECTRONICS, INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/337,649

(22) Filed: Jun. 20, 2023

(65) Prior Publication Data

US 2023/0345463 A1    Oct. 26, 2023

Related U.S. Application Data

(63) Continuation of application No. PCT/KR2022/000521, filed on Jan. 12, 2022.

(30) Foreign Application Priority Data

Jan. 12, 2021    (KR) .................. 10-2021-0004269

(51) Int. Cl.
*H04W 72/1263*    (2023.01)
*H04W 72/25*    (2023.01)
*H04L 1/1812*    (2023.01)
*H04L 5/00*    (2006.01)
*H04W 76/28*    (2018.01)

(52) U.S. Cl.
CPC ....... *H04W 72/1263* (2013.01); *H04L 1/1812* (2013.01); *H04L 5/0053* (2013.01); *H04W 72/25* (2023.01); *H04W 76/28* (2018.02)

(58) Field of Classification Search
None
See application file for complete search history.

(56) References Cited

U.S. PATENT DOCUMENTS

2020/0359375 A1\* 11/2020 Hwang ................. H04L 1/1854
2022/0070829 A1\* 3/2022 Kusashima .......... H04L 1/1861
(Continued)

*Primary Examiner* — Nguyen H Ngo
(74) *Attorney, Agent, or Firm* — LEE, HONG, DEGERMAN, KANG & WAIMEY

(57) ABSTRACT

Presented in one embodiment is a method by which a first device performs wireless communication. The method may comprise the steps of: acquiring a sidelink discontinuous reception (SL DRX) configuration; receiving, from a second device, first sidelink control information (SCI) for scheduling a first physical sidelink shared channel (PSSCH) through a first physical sidelink control channel (PSCCH); receiving, from the second device, second SCI and first data through the first physical sidelink shared channel (PSSCH); and determining a first physical sidelink feedback channel (PSFCH) resource on the basis of a slot index and a sub-channel index, which are related to the first PSSCH. For example, a first timer included in the SL DRX configuration can be initiated on the basis of the omission of a first PSFCH transmission related to the first PSSCH on the first PSFCH resource.

19 Claims, 21 Drawing Sheets

(56) References Cited

U.S. PATENT DOCUMENTS

2022/0225469 A1* 7/2022 Lee .................. H04W 76/28
2023/0239961 A1* 7/2023 Lu .................. H04W 52/0229
　　　　　　　　　　　　　　　　　　　　370/311

* cited by examiner (a)          (b)          (c)

● : TX UE
◍ : RX UE

METHOD AND DEVICE FOR PERFORMING SL DRX OPERATION ON BASIS OF HARQ FEEDBACK IN NR V2X

CROSS-REFERENCE TO RELATED APPLICATION(S)

This application is a continuation of International Application No. PCT/KR2022/000521, filed on Jan. 12, 2022, which claims the benefit of earlier filing date and right of priority to Korean Patent Application No. 10-2021-0004269, filed on Jan. 12, 2021, the contents of all of which are hereby incorporated by reference herein in their entireties.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

Meanwhile, in a sidelink communication, a UE may perform a sidelink discontinuous reception (SL DRX) operation to save power of the UE. For example, in an SL hybrid automatic repeat request (HARQ) feedback operation that transmits only a negative acknowledgment (NACK), when the receiving UE performing the SL DRX operation skips/omits the NACK transmission, the transmitting UE may not perform an additional retransmission operation by assuming that the receiving UE has successfully received the MAC protocol data unit (PDU). On the other hand, since the receiving UE has not yet succeeded in receiving the MAC PDU, a problem of re-setting or extending the SL DRX timer may occur.

In addition, for example, in the SL HARQ feedback operation for transmitting an ACK and a NACK, when the receiving UE performing the SL DRX operation skips/omits the ACK transmission, the transmitting terminal may assume that the receiving UE has not received the MAC PDU and perform an additional retransmission operation. On the other hand, since the receiving UE succeeds in receiving the MAC PDU, a problem of not re-setting or extending the SL DRX timer may occur.

According to an embodiment of the present disclosure, a method for a first device to perform wireless communication is proposed. The method comprises: obtaining a sidelink discontinuous reception (SL DRX) configuration; receiving first sidelink control information (SCI) for scheduling a first physical sidelink shared channel (PSSCH) through a first physical sidelink control channel (PSCCH) from a second device; receiving second SCI and first data from the second device through the first PSSCH; and determining a first physical sidelink feedback channel (PSFCH) resource based on an index of a slot and an index of a subchannel which are related to the first PSSCH, wherein a first timer included in the SL DRX configuration is started based on skipping of a first PSFCH transmission related to the first PSSCH on the first PSFCH resource. For example, a first timer included in the SL DRX configuration is started based on skipping of a first PSFCH transmission related to the first PSSCH on the first PSFCH resource.

According to an embodiment of the present disclosure, a first device for performing wireless communication may be provided. For example, the first device may include one or more memories for storing instructions; one or more transceivers; and one or more processors connecting the one or more memories and the one or more transceivers. For example, the one or more processors execute the instructions to obtain a sidelink discontinuous reception (SL DRX) configuration; receive first sidelink control information (SCI) for scheduling a first physical sidelink shared channel (PSSCH) through a first physical sidelink control channel (PSCCH) from a second device; and receiving second SCI and first data from the second device through the first PSSCH; and determine a first physical sidelink feedback channel (PSFCH) resource based on an index of a slot and an index of a subchannel which are related to the first PSSCH. For example, a first timer included in the SL DRX configuration is started based on skipping of a first PSFCH transmission related to the first PSSCH on the first PSFCH resource.

According to an embodiment of the present disclosure, an apparatus configured to control the first UE may be provided. For example, one or more processors; and one or more memories operably coupled by the one or more processors and storing instructions. For example, the one or more processors execute the instructions to obtain a sidelink discontinuous reception (SL DRX) configuration; receive first sidelink control information (SCI) for scheduling a first physical sidelink shared channel (PSSCH) through a first physical sidelink control channel (PSCCH) from a second UE; receive second SCI and first data from the second UE through the first PSSCH; and determine a first physical sidelink feedback channel (PSFCH) resource based on an index of a slot and an index of a subchannel which are related to the first PSSCH. For example, wherein a first timer included in the SL DRX configuration is started based on skipping of a first PSFCH transmission related to the first PSSCH on the first PSFCH resource.

According to an embodiment of the present disclosure, a non-transitory computer readable medium (CRM) storing instructions may be provided. For example, the instructions, when executed, cause the first device to: obtain a sidelink discontinuous reception (SL DRX) configuration; receive first sidelink control information (SCI) for scheduling a first physical sidelink shared channel (PSSCH) through a first physical sidelink control channel (PSCCH) from a second device; receive second SCI and first data from the second device through the first PSSCH; and determine a first physical sidelink feedback channel (PSFCH) resource based on an index of a slot and an index of a subchannel which are related to the first PSSCH. For example, a first timer included in the SL DRX configuration is started based on skipping of a first PSFCH transmission related to the first PSSCH on the first PSFCH resource.

According to an embodiment of the present disclosure, a method for a second device to perform wireless communication is proposed. The method comprises: transmitting first sidelink control information (SCI) for scheduling a first physical sidelink shared channel (PSSCH) through a first physical sidelink control channel (PSCCH) to a first device; and transmitting second SCI and first data to the first device through the first PSSCH. For example, a sidelink discontinuous reception (SL DRX) configuration is obtained. For example, wherein a first physical sidelink feedback channel (PSFCH) resource is determined based on an index of a slot and an index of a subchannel which are related to the first PSSCH. For example, wherein a first timer included in the SL DRX configuration is started based on skipping of a first PSFCH transmission related to the first PSSCH on the first PSFCH resource.

According to an embodiment of the present disclosure, a second device for performing wireless communication may be provided. For example, the second device may include one or more memories to store instructions; one or more transceivers; and one or more processors connecting the one or more memories and the one or more transceivers. For example, the one or more processors execute the instructions to transmit first sidelink control information (SCI) for scheduling a first physical sidelink shared channel (PSSCH) through a first physical sidelink control channel (PSCCH) to a first device; and transmit second SCI and first data to the first device through the first PSSCH. For example, a sidelink discontinuous reception (SL DRX) configuration is obtained. For example, a first physical sidelink feedback channel (PSFCH) resource is determined based on an index of a slot and an index of a subchannel which are related to the first PSSCH. For example, a first timer included in the SL DRX configuration is started based on skipping of a first PSFCH transmission related to the first PSSCH on the first PSFCH resource.

In ACK/NACK-based hybrid automatic repeat request (HARQ) feedback, when a physical sidelink feedback channel (PSFCH) transmission is skipped/omitted, by preventing the transmitting UE from repeating retransmission by mistakenly being a negative acknowledgment (NACK), efficient SL communication can be performed.

In addition, in HARQ feedback for transmitting only a NACK, when the PSFCH transmission is skipped/omitted, by not starting the SL DRX timer, there can be efficient features in terms of power saving.

DETAILED DESCRIPTION

Figure 1:
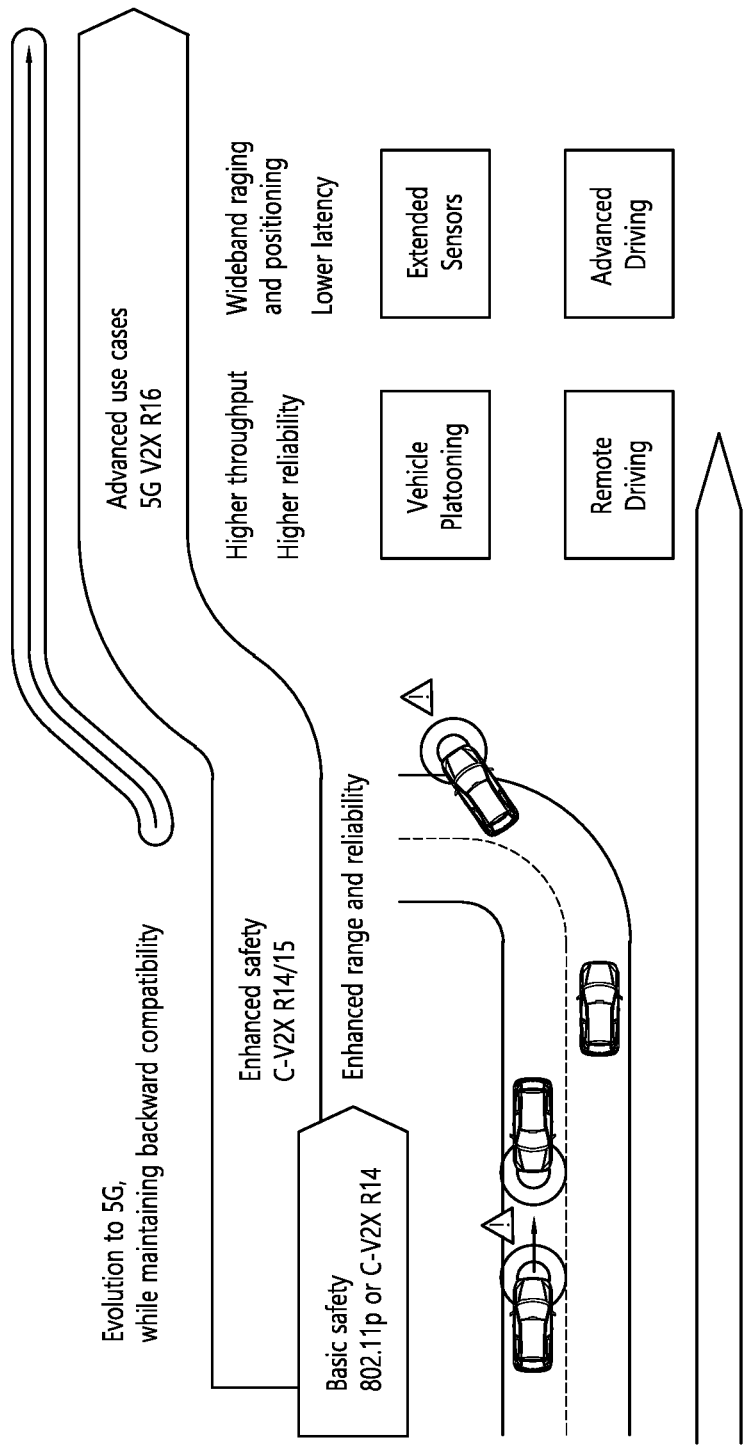
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
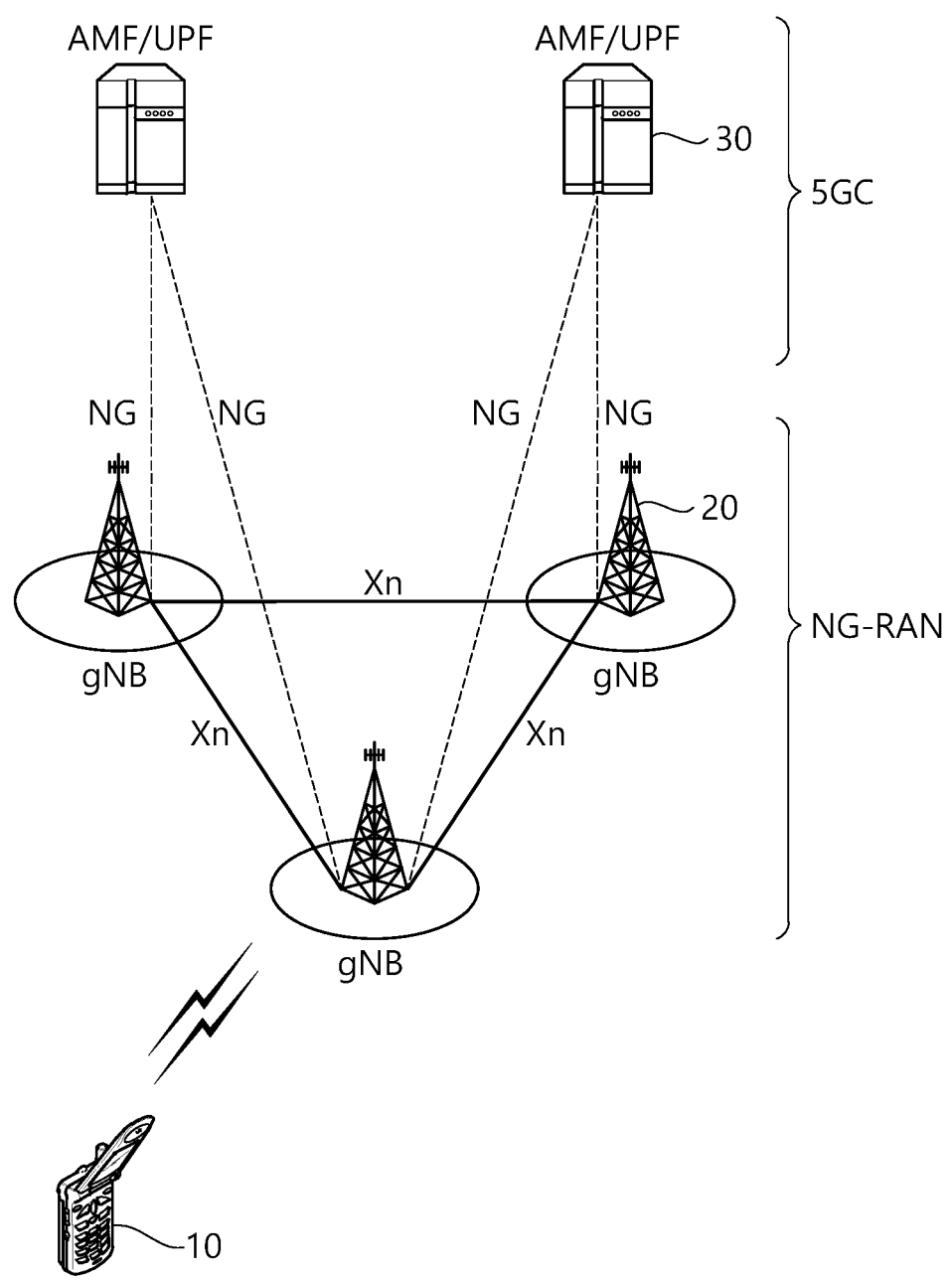
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
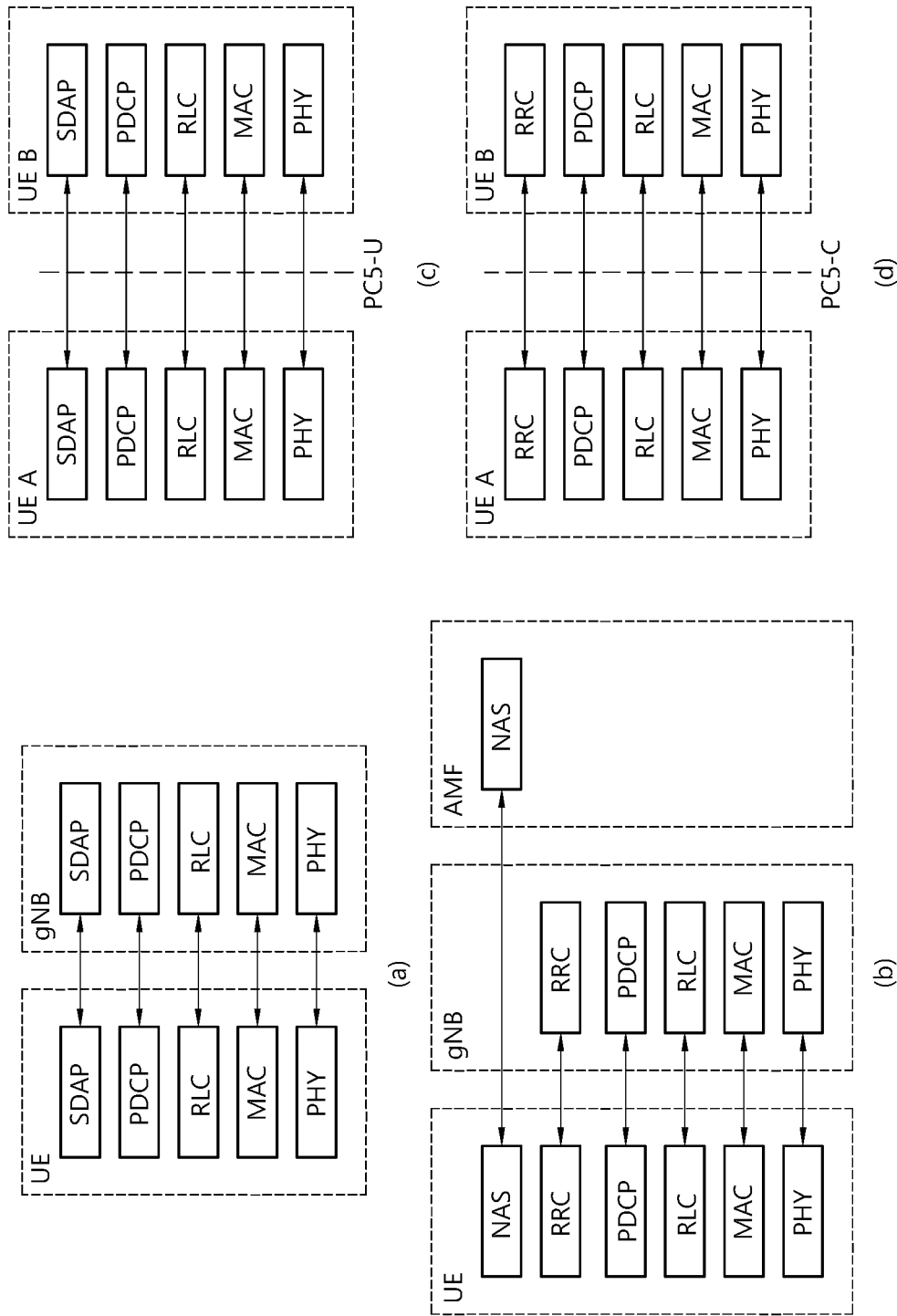
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
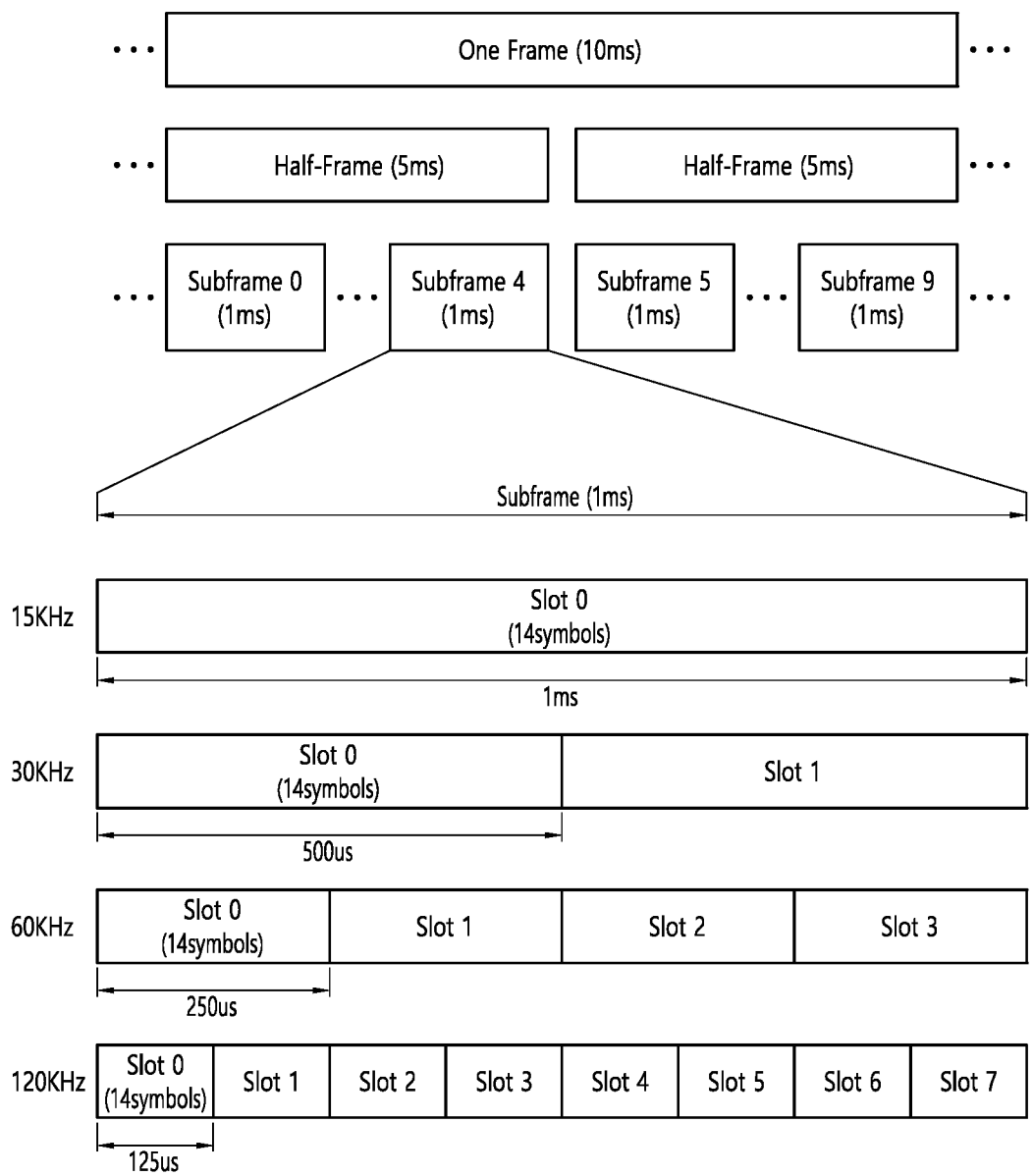
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
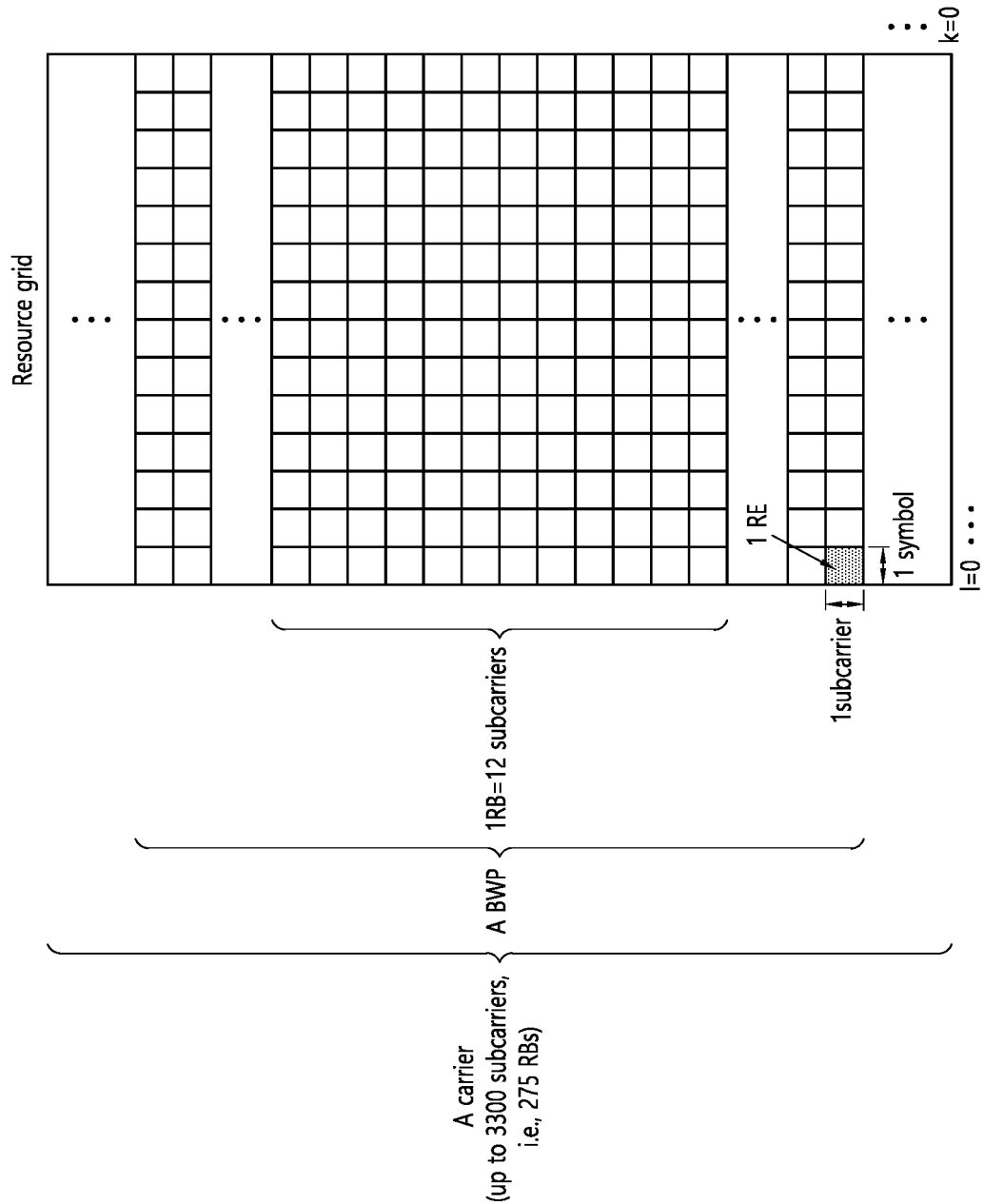
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
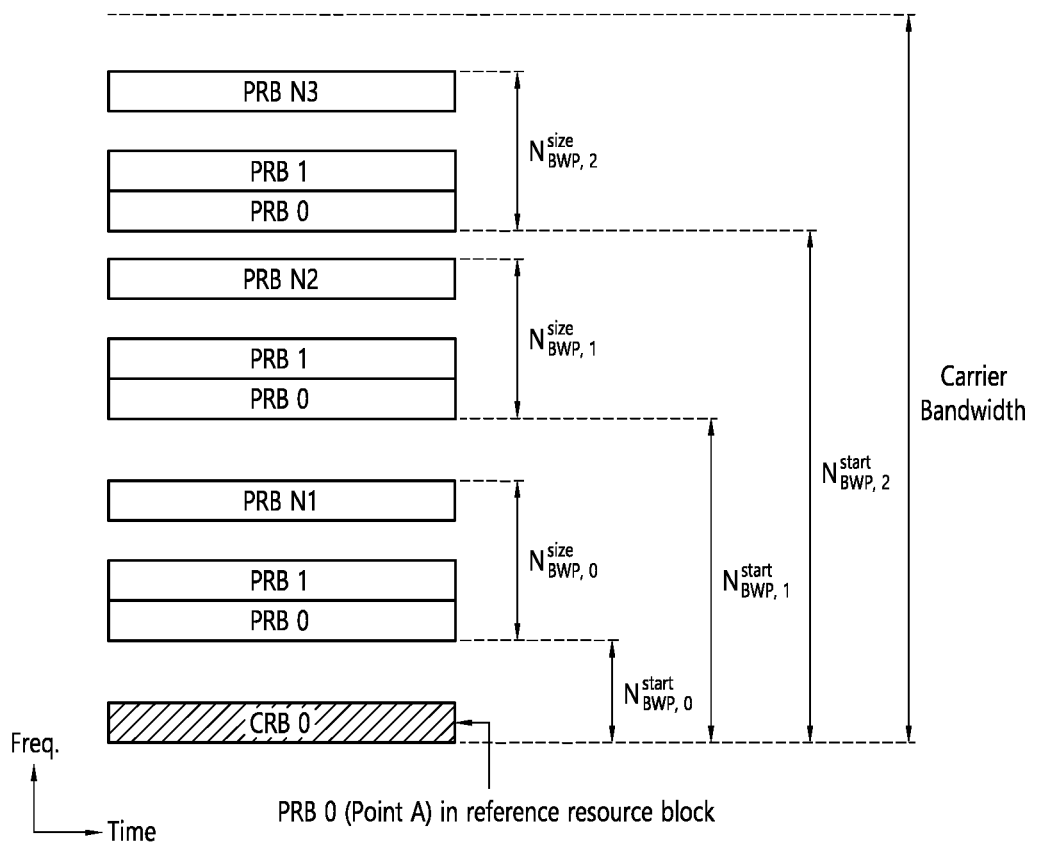
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{stat}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
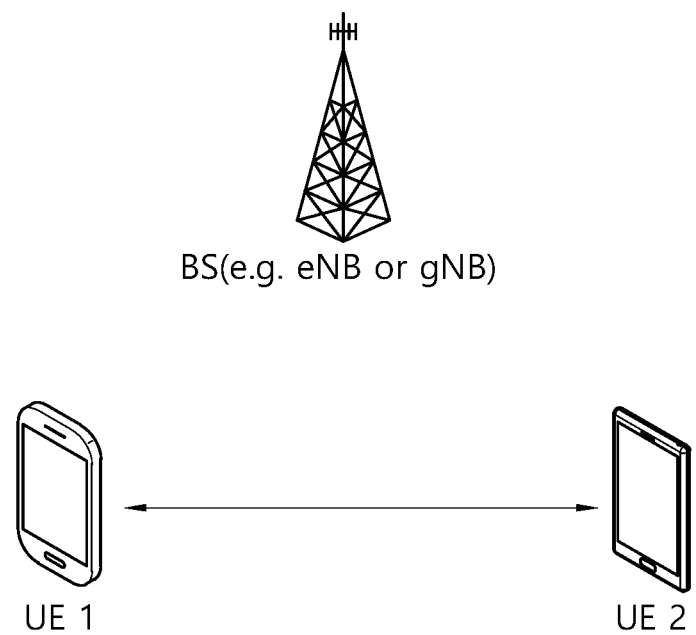
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
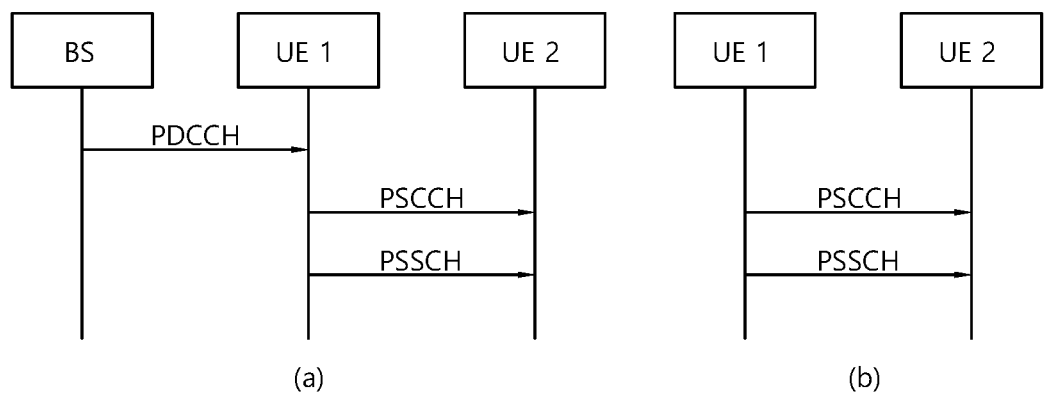
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
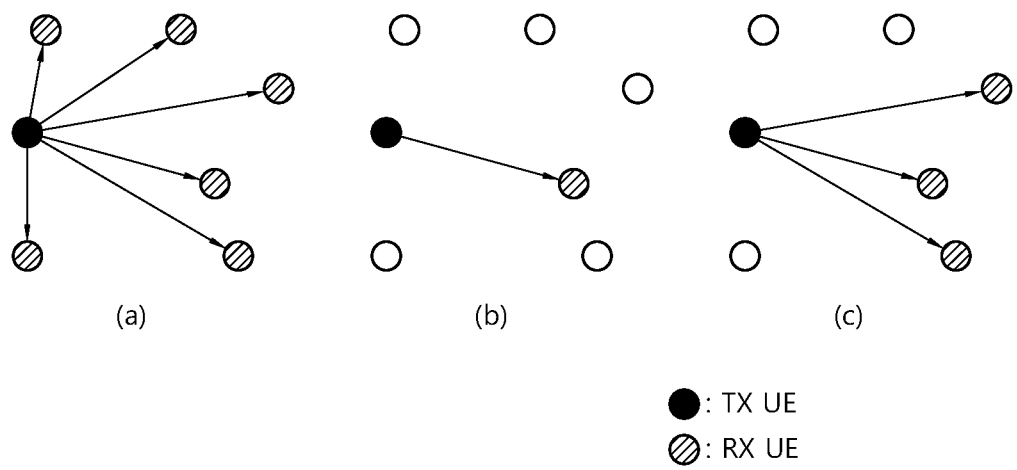
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in the present disclosure, for example, a transmitting UE (TX UE) may be a UE which transmits data to a (target) receiving UE (RX UE). For example, the TX UE may be a UE which performs PSCCH transmission and/or PSSCH transmission. Additionally/alternatively, for example, the TX UE may be a UE which transmits SL CSI-RS(s) and/or a SL CSI report request indicator to the (target) RX UE. Additionally/alternatively, for example, the TX UE may be a UE which transmits a (control) channel (e.g., PSCCH, PSSCH, etc.) and/or reference signal(s) on the (control) channel (e.g., DM-RS, CSI-RS, etc.), to be used for a SL RLM operation and/or a SL RLF operation of the (target) RX UE.

Meanwhile, in the present disclosure, for example, a receiving UE (RX UE) may be a UE which transmits SL HARQ feedback to a transmitting UE (TX UE) based on whether decoding of data received from the TX UE is successful and/or whether detection/decoding of a PSCCH (related to PSSCH scheduling) transmitted by the TX UE is successful. Additionally/alternatively, for example, the RX UE may be a UE which performs SL CSI transmission to the TX UE based on SL CSI-RS(s) and/or a SL CSI report request indicator received from the TX UE. Additionally/alternatively, for example, the RX UE is a UE which transmits a SL (L1) reference signal received power (RSRP) measurement value, to the TX UE, measured based on (pre-defined) reference signal(s) and/or a SL (L1) RSRP report request indicator received from the TX UE. Additionally/alternatively, for example, the RX UE may be a UE which transmits data of the RX UE to the TX UE. Additionally/alternatively, for example, the RX UE may be a UE which performs a SL RLM operation and/or a SL RLF operation based on a (pre-configured) (control) channel and/or reference signal(s) on the (control) channel received from the TX UE.

Meanwhile, in the present disclosure, for example, in case the RX UE transmits SL HARQ feedback information for a PSSCH and/or a PSCCH received from the TX UE, the following options or some of the following options may be considered. Herein, for example, the following options or some of the following options may be limitedly applied only if the RX UE successfully decodes/detects a PSCCH scheduling a PSSCH.

(1) groupcast option 1: no acknowledgement (NACK) information may be transmitted to the TX UE only if the RX UE fails to decode/receive the PSSCH received from the TX UE.

(2) groupcast option 2: If the RX UE succeeds in decoding/receiving the PSSCH received from the TX UE, ACK information may be transmitted to the TX UE, and if the RX UE fails to decode/receive the PSSCH, NACK information may be transmitted to the TX UE.

Meanwhile, in the present disclosure, for example, the TX UE may transmit the following information or some of the following information to the RX UE through SCI(s). Herein, for example, the TX UE may transmit some or all of the following information to the RX UE through a first SCI and/or a second SCI.

PSSCH (and/or PSCCH) related resource allocation information (e.g., the location/number of time/frequency resources, resource reservation information (e.g., period))

SL CSI report request indicator or SL (L1) reference signal received power (RSRP) (and/or SL (L1) reference signal received quality (RSRQ) and/or SL (L1) reference signal strength indicator (RSSI)) report request indicator SL CSI transmission indicator (or SL (L1) RSRP (and/or SL (L1) RSRQ and/or SL (L1) RSSI) information transmission indicator) (on a PSSCH)

Modulation and Coding Scheme (MCS) information

TX power information

L1 destination ID information and/or L1 source ID information

SL HARQ process ID information

New Data Indicator (NDI) information

Redundancy Version (RV) information (Transmission traffic/packet related) QoS information (e.g., priority information)

SL CSI-RS transmission indicator or information on the number of antenna ports for (transmitting) SL CSI-RS TX UE location information or location (or distance range) information of the target RX UE (for which SL HARQ feedback is requested)

Reference signal (e.g., DM-RS, etc.) information related to decoding (and/or channel estimation) of data transmitted through a PSSCH. For example, information related to a pattern of (time-frequency) mapping resources of DM-RS(s), RANK information, antenna port index information, information on the number of antenna ports, etc.

Meanwhile, in the present disclosure, for example, since the TX UE may transmit a SCI, a first SCI and/or a second SCI to the RX UE through a PSCCH, the PSCCH may be replaced/substituted with the SCI and/or the first SCI and/or the second SCI. Additionally/alternatively, the SCI may be replaced/substituted with the PSCCH and/or the first SCI and/or the second SCI. Additionally/alternatively, for example, since the TX UE may transmit a second SCI to the RX UE through a PSSCH, the PSSCH may be replaced/substituted with the second SCI.

Meanwhile, in the present disclosure, for example, if SCI configuration fields are divided into two groups in consideration of a (relatively) high SCI payload size, the first SCI including a first SCI configuration field group may be referred to as a $1^{st}$ SCI, and the second SCI including a second SCI configuration field group may be referred to as a $2^{nd}$ SCI. Also, for example, the $1^{st}$ SCI may be transmitted to the receiving UE through a PSCCH. Also, for example, the $2^{nd}$ SCI may be transmitted to the receiving UE through a (independent) PSCCH or may be piggybacked and transmitted together with data through a PSSCH.

Meanwhile, in the present disclosure, for example, the term "configure/configured" or the term "define/defined" may refer to (pre)configuration from a base station or a network (through pre-defined signaling (e.g., SIB, MAC, RRC, etc.)) (for each resource pool).

Meanwhile, in the present disclosure, for example, since an RLF may be determined based on out-of-synch (OOS) indicator(s) or in-synch (IS) indicator(s), the RLF may be replaced/substituted with out-of-synch (OOS) indicator(s) or in-synch (IS) indicator(s).

Meanwhile, in the present disclosure, for example, an RB may be replaced/substituted with a subcarrier. Also, in the present disclosure, for example, a packet or a traffic may be replaced/substituted with a TB or a MAC PDU based on a transmission layer.

Meanwhile, in the present disclosure, a CBG may be replaced/substituted with a TB.

Meanwhile, in the present disclosure, for example, a source ID may be replaced/substituted with a destination ID.

Meanwhile, in the present disclosure, for example, an L1 ID may be replaced/substituted with an L2 ID. For example, the L1 ID may be an L1 source ID or an L1 destination ID. For example, the L2 ID may be an L2 source ID or an L2 destination ID.

Meanwhile, in the present disclosure, for example, an operation of the transmitting UE to reserve/select/determine retransmission resource(s) may include: an operation of the transmitting UE to reserve/select/determine potential retransmission resource(s) for which actual use will be determined based on SL HARQ feedback information received from the receiving UE.

Meanwhile, in the present disclosure, a sub-selection window may be replaced/substituted with a selection window and/or the pre-configured number of resource sets within the selection window, or vice versa.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in the CG type 1, a grant may be provided by RRC signaling and may be stored as a configured grant. For example, in the CG type 2, a grant may be provided by a PDCCH, and may be stored or deleted as a configured grant based on L1 signaling indicating activation or deactivation of the grant.

Meanwhile, in the present disclosure, a channel may be replaced/substituted with a signal, or vice versa. For example, transmission/reception of a channel may include transmission/reception of a signal. For example, transmission/reception of a signal may include transmission/reception of a channel. In addition, for example, cast may be replaced/substituted with at least one of unicast, groupcast, and/or broadcast, or vice versa. For example, a cast type may be replaced/substituted with at least one of unicast, groupcast, and/or broadcast, or vice versa.

Meanwhile, in the present disclosure, a resource may be replaced/substituted with a slot or a symbol, or vice versa. For example, the resource may include a slot and/or a symbol.

Meanwhile, in the present disclosure, a priority may be replaced/substituted with at least one of logical channel prioritization (LCP), latency, reliability, minimum required communication range, prose per-packet priority (PPPP), sidelink radio bearer (SLRB), QoS profile, QoS parameter and/or requirement, or vice versa.

Meanwhile, in various embodiments of the present disclosure, a reserved resource and/or a selected resource may be replaced with a sidelink grant (SL GRANT).

Meanwhile, in various embodiments of the present disclosure, latency may be replaced with a packet delay budget (PDB).

Meanwhile, in various embodiments of the present disclosure, a message for triggering a report on sidelink channel state information/sidelink channel quality information (hereinafter, SL_CSI information) may be replaced with reception of sidelink channel state information reference signal (CSI-RS).

Meanwhile, in the present disclosure, blind retransmission may refer that the TX UE performs retransmission without receiving SL HARQ feedback information from the RX UE. For example, SL HARQ feedback-based retransmission may refer that the TX UE determines whether to perform retransmission based on SL HARQ feedback information received from the RX UE. For example, if the TX UE receives NACK and/or DTX information from the RX UE, the TX UE may perform retransmission to the RX UE.

Meanwhile, in the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, in the present disclosure, a Uu channel may include a UL channel and/or a DL channel. For example, the UL channel may include a PUSCH, a PUCCH, a sounding reference Signal (SRS), etc. For example, the DL channel may include a PDCCH, a PDSCH, a PSS/SSS, etc. For example, a SL channel may include a PSCCH, a PSSCH, a PSFCH, a PSBCH, a PSSS/SSSS, etc.

Meanwhile, in NR V2X communication or NR sidelink communication, a transmitting UE may reserve/select one or more transmission resources for sidelink transmission (e.g., initial transmission and/or retransmission), and the transmitting UE may transmit information on the location of the one or more transmission resources to receiving UE(s).

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

Figure 10:
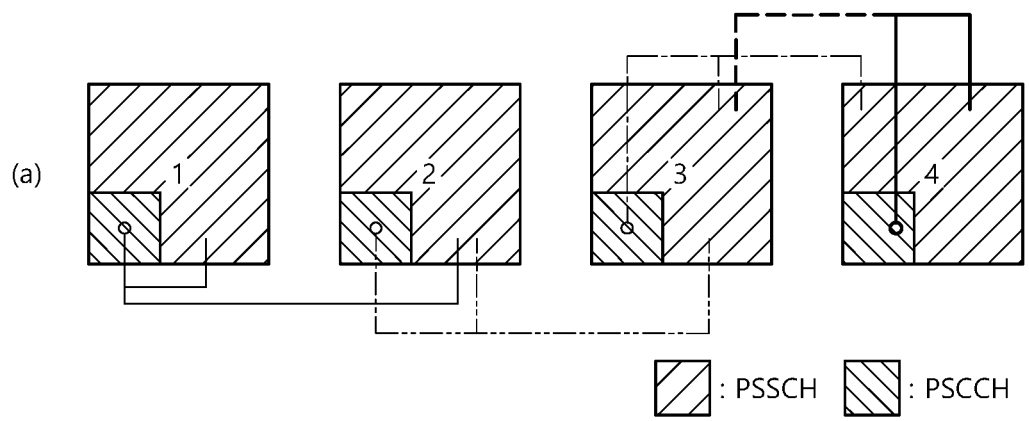
FIG. 10 shows a method in which a UE that has reserved transmission resource(s) informs another UE of the transmission resource(s), based on an embodiment of the present disclosure.
Figure 10:
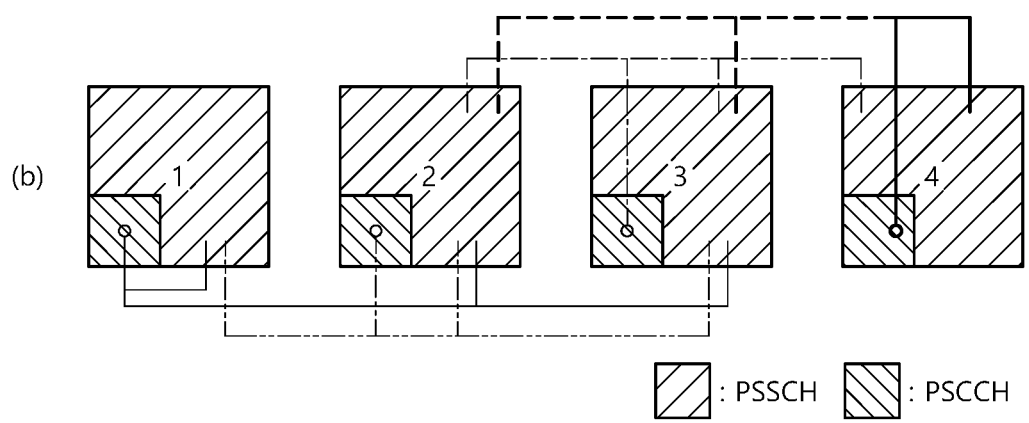
Figure 10:
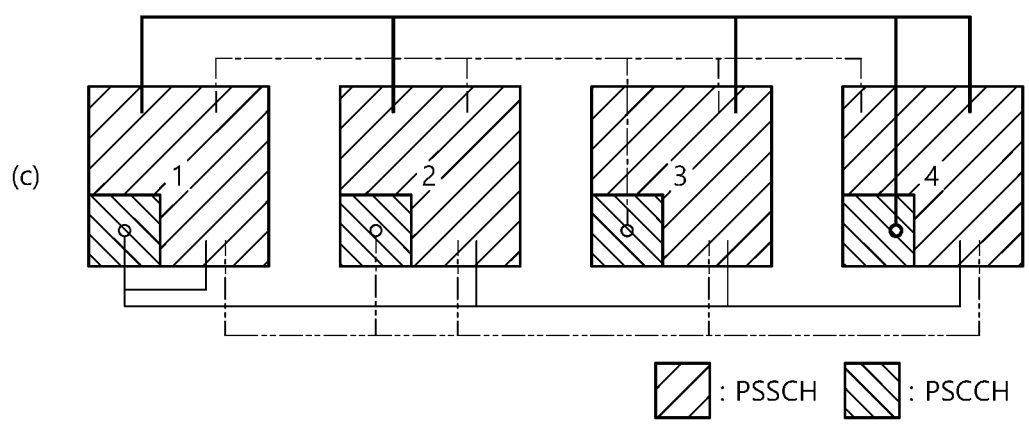

FIG. 10 shows a method in which a UE that has reserved transmission resource(s) informs another UE of the transmission resource(s), based on an embodiment of the present disclosure. The embodiment of FIG. 10 may be combined with various embodiments of the present disclosure.

Specifically, for example, (a) of FIG. 10 shows a method for performing by a transmitting UE chain-based resource reservation by transmitting/signaling location information of (maximum) 2 transmission resources to receiving UE(s) through one SCI, in the case of a value of K=4. For example, (b) of FIG. 10 shows a method for performing by a transmitting UE chain-based resource reservation by transmitting/signaling location information of (maximum) 3 transmission resources to receiving UE(s) through one SCI, in the case of a value of K=4. For example, referring to (a) and (b) of FIG. 10, the transmitting UE may transmit/signal only location information of the fourth transmission-related resource to the receiving UE(s) through the fourth (or last) transmission-related PSCCH. For example, referring to (a) of FIG. 10, the transmitting UE may transmit/signal to the receiving UE(s) not only location information of the fourth transmission-related resource but also location information of the third transmission-related resource additionally through the fourth (or last) transmission-related PSCCH. For example, referring to (b) of FIG. 10, the transmitting UE may transmit/signal to the receiving UE(s) not only location information of the fourth transmission-related resource but also location information of the second transmission-related resource and location information of the third transmission-related resource additionally through the fourth (or last) transmission-related PSCCH. In this case, for example, in (a) and (b) of FIG. 10, if the transmitting UE may transmit/signal to the receiving UE(s) only location information of the fourth transmission-related resource through the fourth (or last) transmission-related PSCCH, the transmitting UE may set or designate a field/bit of location information of unused or remaining transmission resource(s) to a pre-configured value (e.g., 0). For example, in (a) and (b) of FIG. 10, if the transmitting UE may transmit/signal to the receiving UE(s) only location information of the fourth transmission-related resource through the fourth (or last) transmission-related PSCCH, the transmitting UE may be set or designate a field/bit of location information of unused or remaining transmission resource(s) to a pre-configured status/bit value indicating/representing the last transmission (among 4 transmissions).

Meanwhile, for example, the transmitting UE may perform a reservation of transmission resource(s) based on a block. Specifically, for example, if the transmitting UE reserves K transmission resources, the transmitting UE may transmit location information for K transmission resources to receiving UE(s) through a SCI transmitted to the receiving UE(s) at any (or specific) transmission time or a time resource. That is, the SCI may include location information for K transmission resources. For example, if the transmitting UE reserves K transmission resources related to a specific TB, the transmitting UE may transmit location information for K transmission resources to receiving UE(s) through a SCI transmitted to the receiving UE(s) at any (or specific) transmission time or a time resource. That is, the SCI may include location information for K transmission resources. For example, (c) of FIG. 10 shows a method for performing by the transmitting UE block-based resource reservation, by signaling location information of 4 transmission resources to receiving UE(s) through one SCI, in the case of a value of K=4.

For example, SL DRX configuration may include one or more pieces/elements of information listed below.

For example, SL drx-onDurationTimer may be information related to the duration at the beginning of a DRX Cycle. For example, the duration at the beginning of a DRX Cycle may be information related to the duration in which the UE operates in the active mode to transmit or receive sidelink data.

For example, SL drx-SlotOffset may be information related to the delay before starting the drx-onDurationTimer of the DRX-on duration timer.

For example, SL drx-InactivityTimer may be information indicating the duration after the PSCCH occasion in which a PSCCH indicates a new sidelink transmission and reception for the MAC entity. For example, when the transmitting UE indicates a PSSCH transmission through a PSCCH, the transmitting UE may operate in an active mode while the SL drx-InactivityTimer is operating/running, so that the transmitting UE can transmit the PSSCH to a receiving UE. Also, for example, when the receiving UE receives, through PSCCH reception, an indication that the transmitting UE transmits the PSSCH, the receiving UE may operate in an active mode while the SL drx-InactivityTimer is operating/running, so that the receiving UE is the transmitting can receive PSSCH from a transmitting UE.

For example, the SL drx-RetransmissionTimer may be information related to the maximum duration until a retransmission is received. For example, the SL drx-RetransmissionTimer may be configured for each HARQ process.

For example, SL drx-LongCycleStartOffset information related to the Long DRX cycle and drx-StartOffset which defines the subframe where the Long and Short DRX Cycle starts For example, SL drx-ShortCycle may be information related to the Short DRX cycle. For example, the SL drx-ShortCycle may be optional information.

For example, the SL drx-ShortCycleTimer may be information related to the duration the UE shall follow the Short DRX cycle. For example, the SL drx-ShortCycleTimer may be optional information.

For example, the SL drx-HARQ-RTT-Timer may be information related to the minimum duration before an assignment for a HARQ retransmission is expected by the MAC entity. For example, the SL drx-HARQ-R TT-Timer may be configured for each HARQ process.

In the meantime, for example, when SL communication is performed based on an SL HARQ feedback operation performing feedback of a NACK only (hereinafter, a NACK ONLY-based SL HARQ feedback operation), according to various embodiments of the present disclosure, re-set/extension of an SL DRX timer and/or of the active time may be performed. Here, for example, the SL HARQ feedback operation may include a PSFCH transmission and/or PSFCH reception. For example, the NACK ONLY-based SL HARQ feedback operation may be an operation of transmitting NACK information to the TX UE only when the RX UE fails to decode/receive the PSSCH received from the TX UE.

According to an embodiment of the present disclosure, when a plurality of PSFCH transmissions overlap at the same time point, some or all of the plurality of PSFCH transmissions may be skipped/omitted. For example, from the viewpoint of a specific UE, when a plurality of PSFCH transmissions overlap on the same time point, some or all of a plurality of PSFCHs may be skipped/omitted based on a priority of PSSCH and/or SL data related to the PSFCH and the maximum number of PSFCHs capable of simultaneous transmission by the UE.

For example, from the viewpoint of a specific UE, when a PSFCH transmission and a PSFCH reception overlap on the same time point, the PSFCH transmission or PSFCH reception may be skipped/omitted based on a priority of PSSCH and/or SL data related to PSFCH and the maximum number of PSFCHs capable of simultaneous transmission by the UE.

For example, from the viewpoint of a specific UE, when a PSFCH transmission and a UL control/data transmission overlap on the same time point, the PSFCH transmission may be skipped/omitted based on a priority of PSSCH and/or SL data related to the PSFCH, a priority of UL control/data, and the maximum number of PSFCHs capable of simultaneous transmission by the UE. Here, for example, the UL control/data may include a UL channel through which SL HARQ feedback, SL BSR, and/or SL SR are transmitted/piggybacked.

For example, from the viewpoint of a specific UE, when a PSFCH reception and a UL transmission overlap on the same time point, PSFCH reception may be skipped/omitted based on a priority of PSSCH and/or SL data related to the PSFCH, a priority of UL control/data, and the maximum number of PSFCHs capable of simultaneous transmission by the UE Here, for example, the UL control/data may include a UL channel through which SL HARQ feedback, SL BSR, and/or SL SR are transmitted/piggybacked.

For example, from the viewpoint of a specific UE, when a transmission/reception of NR PSFCH and a transmission/reception of LTE SL channel/signal (e.g., PSCCH, PSSCH, SL synchronization signal) overlap on the same time point, the NR PSFCH transmission/reception may be skipped/omitted based on a priority of NR PSSCH and/or NR SL data related to NR PSFCH, a priority of the LTE SL channel/signal, and the maximum number of PSFCHs capable of simultaneous transmission by the UE.

For example, when the RX UE performing an SL DRX operation performs a NACK ONLY-based PSFCH transmission operation, if the NACK transmission is skipped/omitted due to one of the above-described examples, a TX UE may assume that the RX UE has successfully received the MAC PDU and may not perform an additional retransmission operation. At this time, nevertheless, since the RX UE has not yet succeeded in receiving the MAC PDU, a problem of re-set/extension of an SL DRX timer and/or an active time may occur. Here, for example, the problem may occur because whether or not to perform re-set/extension of the SL DRX timer and/or active time of the RX UE is determined based on reception/decoding failure for the MAC PDU and not based on whether the NACK is actually transmitted through the PSFCH. In order to solve this problem, various embodiments of the present disclosure to be described later may be applied.

For example, when a NACK ONLY-based SL HARQ feedback operation is performed, the RX UE performing the SL DRX operation may perform re-set/extension of the SL DRX timer and/or active time only when a NACK transmission is actually performed through the PSFCH resource. For example, when a NACK ONLY-based PSFCH transmission operation is performed in groupcast, the RX UE performing the SL DRX operation may perform re-set/extension of the SL DRX timer and/or active timer related to the SL HARQ process related to the NACK transmission only when the NACK transmission is actually performed through the PSFCH resource. For example, in the NACK ONLY-based SL HARQ feedback operation, when the NACK transmission is skipped/omitted, the RX UE may not perform the re-set/extension of the SL DRX timer and/or active time related to the SL HARQ process related to the NACK transmission.

Also, for example, on the other hand, in case an ACK/NACK-based SL HARQ feedback operation is performed, regardless of whether or not the actual NACK is transmitted through a PSFCH resource, the RX UE performing the SL DRX operation may perform the re-set/extension of the SL DRX timer and/or active time when it fails to receive/decode the MAC PDU. Here, for example, the ACK/NACK-based SL HARQ feedback operation may include an operation of transmitting ACK information to the TX UE when the RX UE succeeds in decoding/receiving the PSSCH received from the TX UE, and an operation of transmitting NACK information to the TX UE when the RX UE fails in decoding/receiving the PSSCH. For example, when an ACK/NACK-based SL HARQ feedback operation is performed in groupcast, if the RX UE performing the SL DRX operation fails in receiving/decoding the MAC PDU related to the PSFCH transmission even if the PSFCH transmission is skipped/omitted, the RX UE may perform re-set/extension of the SL DRX timer and/or active time related to the SL HARQ process related to the PSFCH transmission. Additionally, for example, when an ACK/NACK-based SL HARQ feedback operation is performed, the RX UE performing the SL DRX operation may perform re-set/extension of the SL DRX timer and/or active time even if the PSFCH transmission (e.g., ACK or NACK) is skipped/omitted. Here, for example, when an ACK/NACK-based SL HARQ feedback operation is performed, even if the RX UE skips or omits the PSFCH transmission, since the TX UE considers it as DTX and/or NACK and performs a retransmission, in a duration in which there is no retransmission of the UE, a problem of meaninglessly performing a retransmission reception operation may not occur.

According to an embodiment of the present disclosure, an RX UE performing a NACK ONLY-based SL HARQ feedback operation may skip/omit a NACK transmission due to a relatively high priority SL channel/signal reception operation. In this case, for example, after the RX UE checks/detects whether a NACK transmission of another UE is performed on a PSFCH resource, if the NACK transmission of another UE is performed, although the RX UE itself does not perform a NACK transmission, an SL DRX Timer and/or active time reset/extension operation may be performed. For example, the SL channel/signal may include at least one of a PSFCH or an LTE SL channel/signal. For example, the LTE SL channel/signal may include at least one of PSSCH, PSCCH, or SL synchronization signal.

For example, when the above-described embodiment of the present disclosure is applied, as one of examples in which the transmissions overlap, an RX UE performing a NACK ONLY-based SL HARQ feedback operation may skip/omit a NACK transmission due to a relatively high priority SL channel/signal reception operation. In this case, for example, on a PSFCH resource related to the NACK transmission, it is possible to check/detect whether a NACK transmission by another member UE in the same groupcast is performed. At this time, if the NACK transmission of another member UE is performed, although the RX UE itself does not perform a NACK transmission, a re-set/extension operation of the SL DRX timer and/or active time related to the SL HARQ process related to the NACK transmission re-set/extension operation can be performed.

According to an embodiment of the present disclosure, a UE performing an SL DRX operation may consider a PSFCH transmission operation satisfying the following specific condition as a higher priority than other PSFCH reception operations. For example, the RX UE performing the SL DRX operation may consider a PSFCH transmission and/or PSFCH reception operation satisfying the following specific condition as a higher priority than other PSFCH reception and/or transmission operations. Here, for example, the other PSFCH reception and/or transmission may be a PSFCH reception and/or transmission related to a pre-configured service type. For example, the other PSFCH reception and/or transmission may be a PSFCH reception and/or transmission related to a priority of an LCH or service higher than a pre-configured threshold level. For example, the other PSFCH reception and/or transmission may be a PSFCH reception and/or transmission related to a QoS requirement (e.g., reliability, latency) higher than a pre-configured threshold level. For example, the other PSFCH reception and/or transmission may be a PSFCH reception and/or transmission related to a QoS requirement (e.g., reliability, latency) lower than a pre-configured threshold level.

For example, the RX UE performing the SL DRX operation may consider a PSFCH transmission and/or PSFCH reception operation satisfying the following specific condition as a higher priority than a UL control/data transmission and/or reception operation. Here, for example, the UL control/data may include a UL channel through which SL HARQ feedback, SL BSR and/or SL SR are transmitted/ piggybacked.

For example, the RX UE performing the SL DRX operation may consider a PSFCH transmission and/or PSFCH reception operation satisfying the following specific condition as a higher priority than a transmission/reception operation for an LTE SL channel/signal (e.g., PSCCH, PSSCH, SL synchronization signal).

For example, the specific condition may be related to a NACK ONLY-based SL HARQ feedback. For example, when the RX UE transmits and/or receives the NACK ONLY-based SL HARQ feedback in groupcast, the RX UE may determine the transmission and/or reception to have a higher priority than other PSFCH transmission and/or reception operation.

For example, the specific condition may be related to an ACK/NACK-based SL HARQ feedback. For example, when the RX UE transmits and/or receives the ACK/NACK-based SL HARQ feedback in groupcast, the RX UE may determine the transmission and/or reception to have a higher priority than other PSFCH transmission and/or reception operation.

For example, the specific condition may be related to an SL HARQ feedback transmission and/or reception. For example, when the RX UE transmits and/or receives the SL HARQ feedback, the RX UE may determine the transmission and/or reception to have a higher priority than other PSFCH transmission and/or reception operation.

For example, the specific condition may be related to a groupcast communication. For example, when the RX UE performs transmission and/or reception for a PSFCH related to the groupcast communication, the RX UE may determine the transmission and/or reception to have a higher priority than other PSFCH transmission and/or reception operation. Here, for example, an SL channel/signal transmission and/or reception (e.g., PSFCH transmission) related to the groupcast including a relatively great number of members may be considered a higher priority than a transmission and/or reception related to other groupcast. For example, an SL channel/signal transmission and/or reception (e.g., PSFCH transmission) related to the groupcast including a greater number of members than a pre-configured threshold may be considered a high priority than a transmission/reception related to another groupcast, unicast or broadcast.

For example, the specific condition may be related to a unicast communication. For example, when the RX UE performs a transmission and/or reception for a PSFCH related to the unicast communication, the RX UE may determine the transmission and/or reception to have a higher priority than other PSFCH transmission and/or reception operation.

For example, the specific condition may be related to a broadcast communication. For example, when the RX UE performs a transmission and/or reception for a PSFCH related to the broadcast communication, the RX UE may determine the transmission and/or reception to have a higher priority than other PSFCH transmission and/or reception operation.

For example, the specific condition may be related to a PSFCH transmission and/or reception of a pre-configured service type. For example, the specific condition may be related to a PSFCH transmission and/or reception with a priority of an LCH or service higher than a pre-configured threshold level. For example, the specific condition may be related to a transmission and/or reception of a PSFCH with QoS requirements (e.g., reliability, latency) higher than a pre-configured threshold level. For example, the specific condition may be related to a transmission and/or reception of a PSFCH with QoS requirements (e.g., reliability, latency) lower than a pre-configured threshold level.

According to an embodiment of the present disclosure, the following embodiments may be applied to the RX UE performing the SL DRX operation on a reserved resource (hereinafter, RSR_RSC) located after the SL DRX timer and/or active time is expired or over. For example, the RSR_RSC may be a reserved resource signaled by the previous SCI. For example, the RSR_RSC may be a reserved resource located after the SL DRX timer and/or active time related to the SL HARQ process is expired or over. Here, for example, the above-described embodiment of the present disclosure may be applied when the RX UE skips/omits the related PSFCH transmission for a MAC PDU received on a reserved resource before the RSR_RSC. For example, the embodiment of the present disclosure described above may be applied when the RX UE skips/ omits the related PSFCH transmission (e.g., ACK information transmission) due to a relatively high priority channel transmission and/or reception operation for a MAC PDU successfully received on the reserved resource before the RSR_RSC. For example, the reserved resource before the RSR_RSC may be a reserved resource before the SL DRX timer related to the SL HARQ process is expired or over. For example, the reserved resource before the RSR_RSC may be a reserved resource within the active time interval/duration related to the SL HARQ process. For example, the above-described embodiment of the present disclosure may be applied when the RX UE actually successfully receives a PSCCH and/or PSSCH retransmission from the TX UE on the RSR_RSC.

For example, when an embodiment of the present disclosure is applied, for a MAC PDU that has already been successfully received by the RX UE, the TX UE may consider it as DTX and/or NACK and perform a retransmission, thereby alleviating the problem of performing excessively many or meaningless retransmissions. For example, when an embodiment of the present disclosure is applied, the RX UE may skip/omit a PSFCH transmission for the successfully received MAC PDU, and the TX UE may consider it as DTX and/or NACK and perform a retransmission, thereby alleviating the problem of performing excessively many or meaningless retransmissions. For example, when an embodiment of the present disclosure is applied, if the TX UE does not successfully receive the PSFCH of the ACK information actually transmitted by the RX UE, the TX UE may consider it as DTX and/or NACK and perform a retransmission, thereby alleviating the problem of performing excessively many or meaningless retransmissions.

For example, the present disclosure may be applied for a least one of a case in which the RX UE performs an ACK/NACK-based SL HARQ feedback operation; a case in which a packet related to an LCH or service having a priority higher than a pre-configured threshold level is transmitted; a case in which a packet related to an LCH or service with a priority lower than a pre-configured threshold level is transmitted; a case in which a packet related to QoS requirements (e.g. latency, reliability, minimum communication range) higher than a pre-configured threshold is transmitted; a case in which a packet related to QoS requirements (e.g. latency, reliability, minimum communication range) lower than a pre-configured threshold is transmitted; a case in which a congestion level in the resource pool (e.g., CBR) is higher than a pre-configured threshold; and/or a case in which the congestion level in the resource pool (e.g., CBR) is lower than the pre-configured threshold.

For example, the RX UE may additionally perform a PSSCH and/or PSCCH decoding on the RSR_RSC, and then transmit ACK information related to a PSFCH resource related to the RSR_RSC. For example, after the RX UE additionally performs a PSSCH and/or PSCCH decoding related to the TX UE in a slot related to the RSR_RSC, ACK information may always be transmitted on the PSFCH resource related to the RSR_RSC. For example, the RX UE additionally performs the PSSCH and/or PSCCH decoding related to the TX UE on a slot related to RSR_RSC, and then, based on whether the actual PSSCH and/or PSCCH decoding succeeds, ACK/NACK information may be transmitted on the PSFCH resource related to the RSR_RSC. For example, the additional PSSCH and/or PSCCH decoding may be performed in the frequency domain related to the RSR_RSC. For example, the additional PSSCH and/or PSCCH decoding may be performed for all frequency domains within the resource pool.

Here, for example, when a PSCCH and/or PSSCH related to another TX UE is detected/decoded on a slot related to the RSR_RSC, the RX UE may not re-set/extend an SL DRX timer and/or active time of an SL HARQ process related to the PSCCH and/or PSSCH.

Here, for example, when a PSCCH and/or PSSCH related to another TX UE is detected/decoded on a slot related to the RSR_RSC, the RX UE may re-set/extend an SL DRX timer and/or active time of an SL HARQ process related to the PSCCH and/or PSSCH.

For example, the RX UE does not additionally perform a PSSCH and/or PSCCH decoding on the RSR_RSC, and the RX UE may transmit ACK information on a PSFCH resource related to the RSR_RSC. For example, the RX UE may not additionally perform a PSSCH and/or PSCCH decoding related to the TX UE with respect to the RSR_RSC related frequency domain on the RSR_RSC related slot, and the RX UE may transmit ACK information on a PSFCH resource related to the RSR_RSC. For example, the RX UE may not additionally perform a PSSCH and/or PSCCH decoding related to the TX UE with respect to all frequency domains within the resource pool on the RSR_RSC related slot, and the RX UE may transmit ACK information on a PSFCH resource related to the RSR_RSC.

For example, the number of RSR_RSCs for which the RX UE performs a PSFCH transmission and/or an ACK information transmission may be configured differently or independently based on a service type, priority, and/or congestion level in the resource pool. Here, for example, the number of RSR_RSCs may be the maximum number. For example, the number of RSR_RSCs may be the minimum number. For example, the number of RSR_RSCs may be an average number.

In addition, for example, whether the RX UE applies the various embodiments of the present disclosure described above based be configured based on: whether the TX UE is a UE performing an SL DRX operation; whether the TX UE is a power saving UE; whether the RX UE performs a PSFCH transmission related to the MAC PDU successfully received on a reserved resource before an SL DRX timer related to the SL HARQ process related to the RSR_RSC expires; and/or whether the RX UE performs ACK information transmission on the MAC PDU successfully received on the reserved resource before the SL DRX timer related to the SL HARQ process related to the RSR_RSC expires.

For example, when the TX UE is a UE performing an SL DRX operation and/or a power saving UE, the RX UE may apply various embodiments of the present disclosure described above. For example, when the RX UE actually transmits ACK information for a MAC PDU successfully received on a reserved resource before the SL DRX timer related to the SL HARQ process related to the RSR_RSC expires, the various embodiments of the present disclosure provide may not be applied to the RX UE. For example, when the RX UE actually transmits ACK information for a MAC PDU successfully received on the reserved resource within an active time interval/duration related to the SL HARQ process before the RSR_RSC, the various embodiments of the present disclosure may not be applied to the RX UE.

For example, whether the various embodiments of the present disclosure are applied may be determined based on at least one of the following elements/parameters comprising: a service type; LCH-related priority; service-related priority; QoS requirements (e.g., latency, reliability, minimum communication range); PQI parameters; an LCH/MAC PDU transmission with HARQ feedback enabled; an LCH/MAC PDU transmission with HARQ feedback disabled; CBR measure of resource pool; an SL cast type (e.g., unicast, groupcast, broadcast); an SL groupcast HARQ feedback option (e.g., NACK ONLY based feedback, ACK/NACK based feedback, TX-RX distance based NACK ONLY feedback); an SL mode 1 CG type (e.g., SL CG type 1, SL CG type 2); an SL mode type (e.g., mode 1, mode 2); a resource pool; whether a PSFCH resource is a configured resource pool; a source ID; a destination ID; a source L2 ID; a destination L2 ID; PC5 RRC connection link; an SL Link; connection state with the base station (e.g., RRC CONNECTED state, IDLE state, INACTIVE state); an SL HARQ process; an SL HARQ process ID; whether the TX UE or the RX UE performs SL DRX operation; whether it corresponds to a power saving UE; whether PSFCH TX and PSFCH RX overlap from a specific UE perspective; whether a plurality of PSFCH TXs that exceed UE capability overlap; whether PSFCH TX and/or PSFCH RX is omitted; whether the RX UE actually successfully received the PSCCH and/or PSSCH (re)transmission from the TX UE.

For example, parameter setting values related to various embodiments of the present disclosure may be determined based on at least one of the following elements/parameters comprising: a service type; LCH-related priority; service-related priority; QoS requirements (e.g., latency, reliability, minimum communication range); PQI parameters; an LCH/MAC PDU transmission with HARQ feedback enabled; an LCH/MAC PDU transmission with HARQ feedback disabled; CBR measure of resource pool; an SL cast type (e.g., unicast, groupcast, broadcast); an SL groupcast HARQ feedback option (e.g., NACK ONLY based feedback, ACK/NACK based feedback, TX-RX distance based NACK ONLY feedback); an SL mode 1 CG type (e.g., SL CG type 1, SL CG type 2); an SL mode type (e.g., mode 1, mode 2); a resource pool; whether a PSFCH resource is a configured resource pool; a source ID; a destination ID; a source L2 ID; a destination L2 ID; PC5 RRC connection link; an SL Link; connection state with the base station (e.g., RRC CONNECTED state, IDLE state, INACTIVE state); an SL HARQ process; an SL HARQ process ID; whether the TX UE or the RX UE performs SL DRX operation; whether it corresponds to a power saving UE; whether PSFCH TX and PSFCH RX overlap from a specific UE perspective; whether a plurality of PSFCH TXs that exceed UE capability overlap; whether PSFCH TX and/or PSFCH RX is omitted; whether the RX UE actually successfully received the PSCCH and/or PSSCH (re)transmission from the TX UE.

In addition, in various embodiments of the present disclosure, for example, "configuration" or "designation" may mean that a base station informs the UE through a predefined channel/signal (e.g., SIB, RRC, MAC CE). For example, the "configuration" or "designation" may mean a format provided through PRE-CONFIGURATION. For example, the "configuration" or "designation" may be a format in which the UE informs other UEs through a predefined channel/signal (e.g., SL MAC CE, PC5 RRC). Here, for example, the channel/signal may include a channel/signal for a physical layer or a higher layer.

Also, in various embodiments of the present disclosure, for example, "PSFCH" may be replaced with at least one of an NR PSSCH, an NR PSCCH, an NR SL SSB, an LTE PSSCH, an LTE PSCCH, an LTE SL SSB, and a UL channel/signal.

In addition, various embodiments of the present disclosure may be combined with each other.

In various embodiments of the present disclosure, the aforementioned SL DRX timer may be used for the following purposes.

For example, the SL DRX on-duration timer may be used in a period in which a UE performing an SL DRX operation basically needs to operate as an active time in order to receive a PSCCH/PSSCH of a counterpart/peer UE.

For example, the SL DRX deactivation timer may be used in a period for extending the SL DRX on-duration period, which is a period in which a UE performing an SL DRX operation basically needs to operate as an active time to receive a PSCCH/PSSCH of a counterpart/peer UE. That is, for example, the SL DRX on-duration timer may be extended by the SL DRX deactivation timer period. In addition, when the UE receives a new packet (e.g., a new PSSCH) from the counterpart/peer UE, the UE may start the SL DRX deactivation timer to extend the SL DRX on-duration timer.

For example, an SL DRX HARQ RTT timer may be used in a sleep mode operation period until a UE performing SL DRX operation receives a retransmission packet (or PSSCH assignment) transmitted from a counterpart/peer UE. That is, for example, when the UE starts the SL DRX HARQ RTT timer, the UE may determine that the counterpart/peer UE will not transmit a sidelink retransmission packet to itself until the SL DRX HARQ RTT timer expires, and accordingly, the UE may operate in a sleep mode during the corresponding timer.

For example, an SL DRX retransmission timer may be used in an active time period for a UE performing an SL DRX operation to receive a retransmission packet (or PSSCH assignment) transmitted from a counterpart/peer UE. For example, during the SL DRX retransmission timer period, the UE may monitor a reception of a retransmission sidelink packet (or PSSCH assignment) transmitted by the counterpart/peer UE.

In addition, in the present disclosure, for example, an on-duration or an 'Onduration' may be an Active Time duration (i.e., a duration operating in a wake-up state (an RF module being "on") to receive/transmit a wireless signal). For example, an off-duration or an 'Offduration may be a Sleep Time duration (i.e., a duration operating in a sleep mode (an RF module being "off") for power saving, wherein the transmitting UE may not operate in the sleep mode during the sleep time duration, and wherein if necessary, even in the sleep time, it may be allowed to operate as an active time for a moment for a sensing operation/transmission operation).

In the present disclosure, for example, "specific time" may be a time in which the UE operates as an active time for a predefined time in order to receive a sidelink signal or sidelink data from a counterpart/peer UE. there is. For example, the "specific time" may be a time in which the UE operates as an active time as long as a timer (e.g., an SL DRX retransmission timer, an SL DRX inactivity timer, a timer enabling to operate as an active time in the DRX operation of the RX UE) time to receive a sidelink signal or sidelink data from a counterpart/peer UE.

Figure 11:
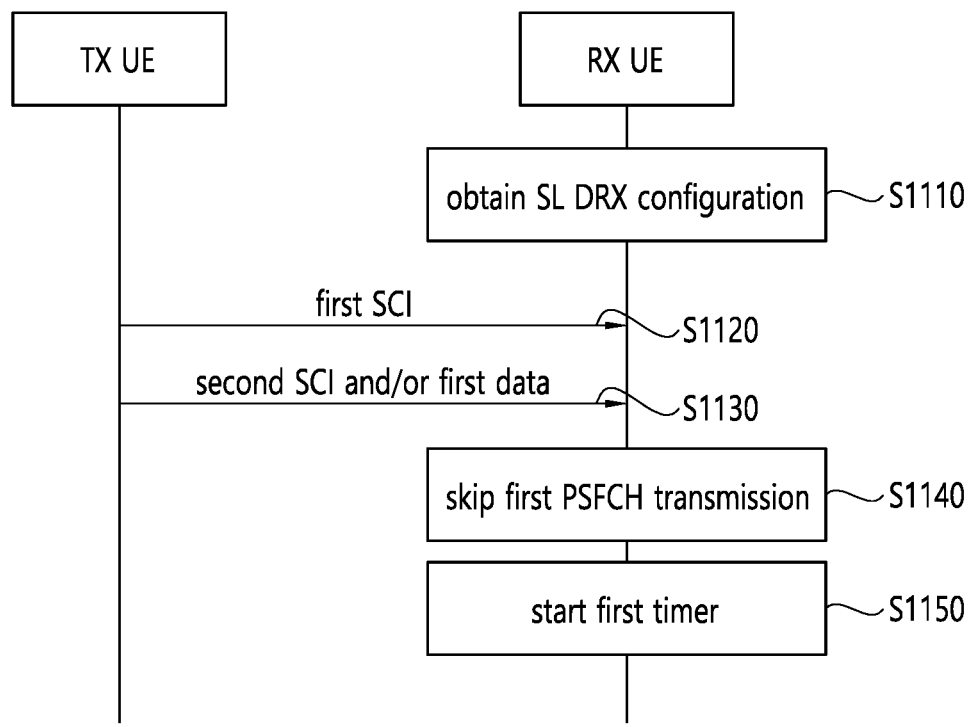
FIG. 11 shows a procedure for a receiving UE to start an SL DRX-related timer according to an embodiment of the present disclosure.

FIG. 11 shows a procedure for a receiving UE to start an SL DRX-related timer according to an embodiment of the present disclosure. The embodiment of FIG. 11 may be combined with various embodiments of the present disclosure.

Referring to FIG. 11, in step S1110, the receiving UE may obtain an SL DRX configuration. For example, the receiving UE may receive the SL DRX configuration from a base station. For example, the receiving UE may receive the SL DRX configuration from the transmitting UE. For example, the SL DRX configuration may include information related to a cycle related to the SL DRX and information related to an SL DRX-related timer. For example, the SL DRX-related timer may include at least one of an SL DRX on-duration timer, an SL DRX deactivation timer, an SL DRX HARQ RTT timer, or an SL DRX retransmission timer.

In step S1120, the receiving UE may receive first SCI for scheduling a first PSSCH through the first PSCCH from the transmitting UE.

In step S1130, the receiving UE may receive second SCI and first data through the first PSSCH from the transmitting UE. For example, the receiving UE may determine a first PSFCH resource based on an index of a slot and an index of a subchannel related to the first PSSCH.

In step S1140, the receiving UE may skip/omit a transmission of the first PSFCH related to the first PSSCH. For example, when a plurality of PSFCH transmissions overlap on the same time point, based on a priority of SL data related to the PSFCH and a maximum number of PSFCHs that the receiving UE can transmit simultaneously, at least one PSFCH transmission may be skipped/omitted from among the plurality of PSFCH transmissions. For example, the at least one PSFCH transmission may include a first PSFCH transmission.

For example, when the first PSFCH transmission and the PSFCH reception overlap on the same time point, the first PSFCH transmission may be skipped/omitted based on the priority of the SL data related to the PSFCH and the maximum number of PSFCHs that the receiving UE can transmit simultaneously.

For example, when the first PSFCH transmission and a UL control/data transmission overlap on the same time point, based on the priority of the SL data related to the PSFCH, the priority related to the UL transmission, and the maximum number of PSFCHs that the receiving UE can transmit simultaneously, the first PSFCH transmission may be skipped/omitted. Here, for example, the UL transmission may include a UL channel through which SL HARQ feedback, SL BSR, and/or SL SR are transmitted/piggybacked.

In step S1150, the receiving UE may start a first timer included in the SL DRX configuration based on skipping/omission of a first PSFCH transmission related to the first PSSCH on the first PSFCH resource.

For example, the first PSFCH may include either an ACK or a NACK.

For example, the first timer may include at least one of an SL DRX HARQ RTT timer, or an SL DRX retransmission timer.

For example, based on the reserved resource located after the first timer expires, the receiving UE may transmit an ACK to the transmitting UE.

For example, decoding of the first PSSCH may be additionally performed on a reserved resource located after the first timer expires. For example, based on a successful decoding, the receiving UE may transmit an ACK to the transmitting UE.

For example, the number of reserved resources located after the first timer expires may be configured differently based on at least one of a service type, priority, or congestion in a resource pool.

Figure 12:
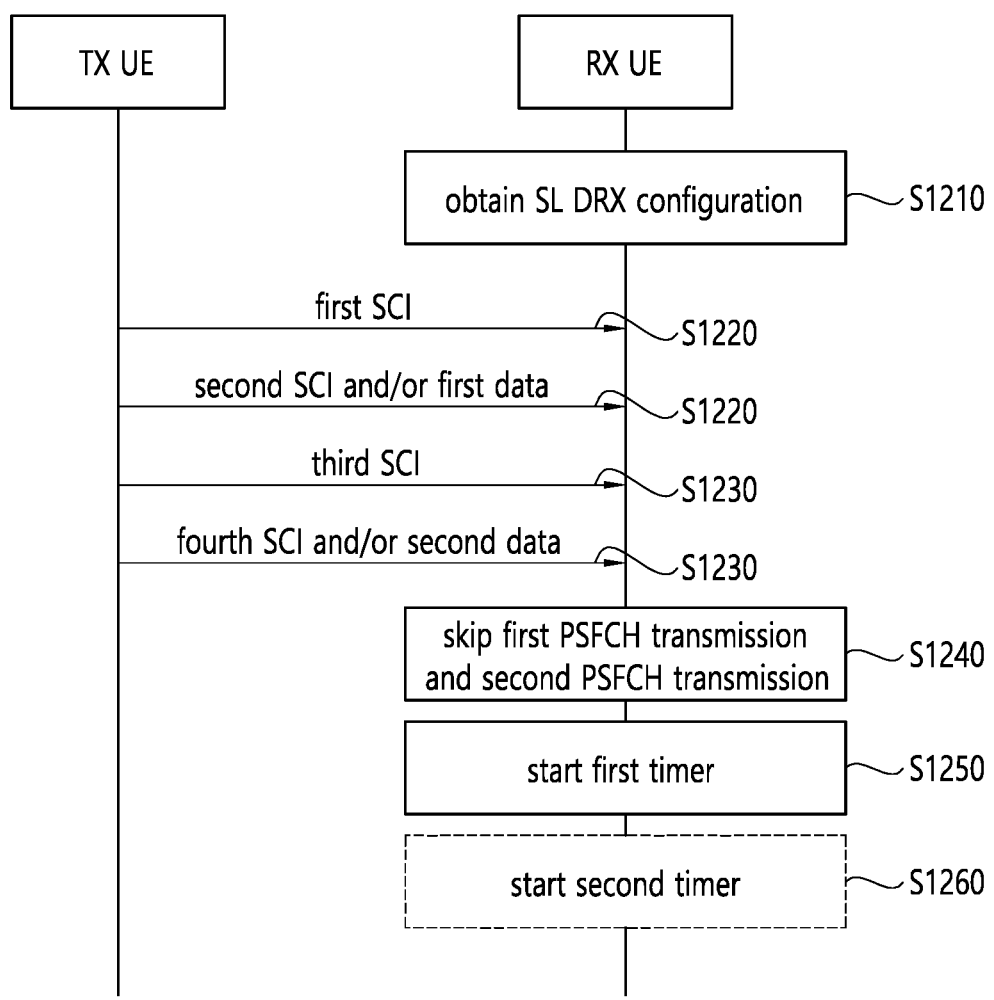
FIG. 12 shows another procedure in which a receiving UE starts an SL DRX-related timer according to an embodiment of the present disclosure.

FIG. 12 shows another procedure in which a receiving UE starts an SL DRX-related timer according to an embodiment of the present disclosure. The embodiment of FIG. 12 may be combined with various embodiments of the present disclosure.

Referring to FIG. 12, in step S1210, the receiving UE may obtain an SL DRX configuration. For example, the receiving UE may receive the SL DRX configuration from the base station. For example, the receiving UE may receive the SL DRX configuration from the transmitting UE. For example, the SL DRX configuration may include information related to a cycle related to the SL DRX and information related to an SL DRX-related timer. For example, the SL DRX-related timer may include at least one of an SL DRX on-duration timer, an SL DRX deactivation timer, an SL DRX HARQ RTT timer, or an SL DRX retransmission timer.

In step S1220, the receiving UE may receive first SCI for scheduling a first PSSCH through the first PSCCH from the transmitting UE. The receiving UE may receive second SCI and first data from the transmitting UE through the first PSSCH. For example, the receiving UE may determine the first PSFCH resource based on an index of a slot and an index of a subchannel related to the first PSSCH. For example, the receiving UE may perform ACK/NACK-based HARQ feedback through the first PSFCH.

In step S1230, the receiving UE may receive third SCI for scheduling a second PSSCH through a second PSCCH from the transmitting UE. The receiving UE may receive fourth SCI and second data through the second PSSCH from the transmitting UE. For example, the receiving UE may determine a second PSFCH resource based on an index of a slot and an index of a subchannel related to the second PSSCH. For example, the receiving UE may perform NACK ONLY-based HARQ feedback through the second PSFCH.

In step S1240, the receiving UE may skip/omit a first PSFCH transmission related to the first PSSCH, and the receiving UE may skip/omit a second PSFCH transmission related to the second PSSCH. In this case, for example, the first PSFCH transmission may be skipped/omitted as in the examples of step S1140 described above. For example, the second PSFCH transmission may be skipped/omitted as in the examples of step S1140 described above.

In step S1250, the receiving UE may start the first timer included in the SL DRX configuration based on the skipping/omission of the first PSFCH transmission related to the first PSSCH on the first PSFCH resource. For example, the receiving UE may not start a second timer included in the SL DRX configuration based on the skipping/omission of the second PSFCH transmission related to the second PSSCH on the second PSFCH resource. For example, the first PSFCH may include either an ACK or a NACK. For example, the second PSFCH may include only a NACK. For example, the first timer may include at least one of an SL DRX HARQ RTT timer or an SL DRX retransmission timer. For example, the second timer may include at least one of an SL DRX HARQ RTT timer or an SL DRX retransmission timer.

In step S1260, the receiving UE may start the second timer based on the transmission of a third PSFCH related to second data by another UE. For example, another UE may be a UE performing the same group cast communication as the receiving UE. For example, the third PSFCH may include only a NACK. For example, if the third PSFCH transmission related to the second data is not performed by another UE, step S1260 may be skipped/omitted.

For example, based on a reserved resource located after the first timer expires, the receiving UE may transmit an ACK to the transmitting UE.

For example, decoding of the first PSSCH may be additionally performed on a reserved resource located after the first timer expires. For example, based on the successful decoding, the receiving UE may transmit an ACK to the transmitting UE.

For example, the number of reserved resources located after the first timer expires may be configured differently based on at least one of a service type, priority, or congestion in the resource pool.

Figure 13:
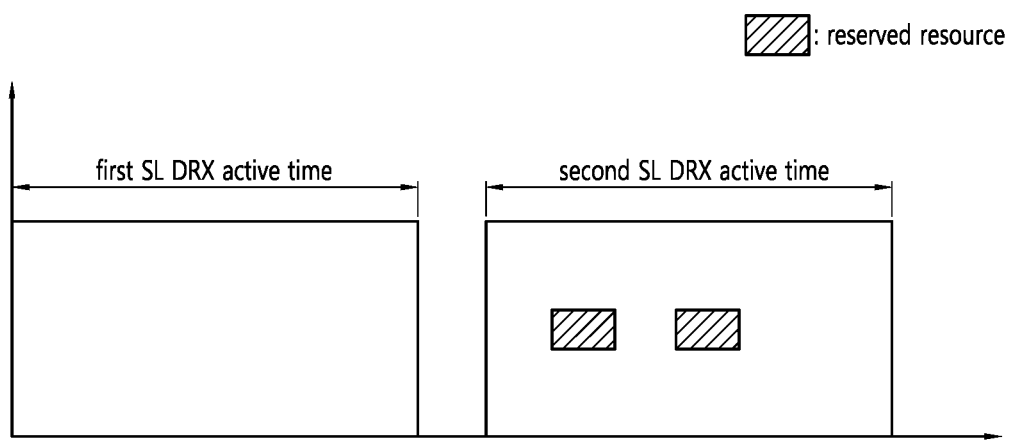
FIG. 13 shows an example of a reserved resource in which a receiving UE is located after an SL DRX-related timer expires, according to an embodiment of the present disclosure.

FIG. 13 shows an example of a reserved resource in which a receiving UE is located after an SL DRX-related timer expires, according to an embodiment of the present disclosure. The embodiment of FIG. 12 may be combined with various embodiments of the present disclosure.

Referring to FIG. 13, when the receiving UE skips/omits a first PSFCH transmission for first data received from the transmitting UE, the receiving UE may start a first SL DRX timer related to the first PSFCH transmission. For example, the first SL DRX timer may be at least one of an SL DRX HARQ RTT timer or an SL DRX retransmission timer. For example, a first SL DRX active time may be an active time related to the first SL DRX timer.

At this time, for example, in an ACK/NACK-based HARQ feedback, when the receiving UE skips/omits the first PSFCH transmission (e.g., SL HARQ ACK or SL HARQ NACK), the transmitting UE may determine the first data related to the first PSFCH as discontinuous detection (DTX). Also, for example, after the first SL DRX timer expires, the receiving UE may transmit an ACK for the first data to the transmitting UE based on the reserved resource. Or, for example, the receiving UE performs decoding of the first data on a reserved resource, and if the decoding is successfully performed, the receiving UE may transmit an ACK for the first data to the transmitting UE based on the reserved resource after the first SL DRX timer expires.

Here, for example, the reserved resource may be located within a second SL DRX active time. For example, the second SL DRX active time may be an active time for an SL communication between the receiving UE and another UE, or an active time for transmitting and receiving data different from the first data.

For example, when detecting a PSCCH and/or PSSCH related to another transmitting UE on the reserved resource, the receiving UE may not start the first SL DRX timer.

Additionally, for example, if the receiving UE does not transmit a PSFCH for HARQ-enabled transmission, the receiving UE may still start the HARQ RTT timer in a symbol or slot after the end of the PSFCH resource. For example, the receiving UE may not transmit the PSFCH due to UL/SL prioritization.

Additionally, for example, in NACK ONLY-based HARQ feedback of a groupcast communication, if a PSFCH transmission (e.g., NACK) is dropped, the SL DRX retransmission timer may not be started. Here, for example, the PSFCH transmission may be dropped due to UL/SL prioritization.

Figure 14:
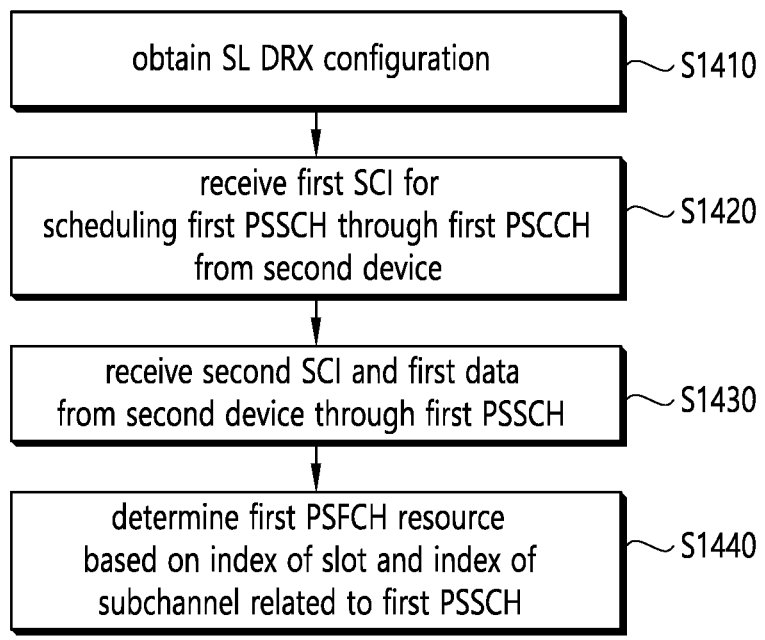
FIG. 14 shows a method for a first device to start an SL DRX-related timer, according to an embodiment of the present disclosure.

FIG. 14 shows a method for a first device to start an SL DRX-related timer, according to an embodiment of the present disclosure. The embodiment of FIG. 14 may be combined with various embodiments of the present disclosure.

Referring to FIG. 14, in step S1410, the first device 100 may obtain an SL sidelink discontinuous reception (SL DRX) configuration.

In step S1420, the first device 100 may receive first sidelink control information (SCI) for scheduling a first physical sidelink shared channel (PSSCH) through a first physical sidelink control channel (PSCCH) from the second device 200.

In step S1430, the first device 100 may receive second SCI and first data from the second device 200 through the first physical sidelink shared channel (PSSCH).

In step S1440, the first device 100 may determine a first physical sidelink feedback channel (PSFCH) resource based on an index of a slot and an index of a subchannel related to the first PSSCH.

For example, based on skipping/omission of the a PSFCH transmission related to a first PSSCH on the first PSFCH resource, a first timer included in the SL DRX configuration may be started.

For example, the first PSFCH may include either an acknowledgment (ACK) or a negative acknowledgment (NACK).

For example, the first timer may include at least one of an SL DRX hybrid automatic repeat request (HARQ) round trip time (RTT) timer or an SL DRX retransmission timer.

For example, the first device 100 may receive third SCI for scheduling a second PSSCH through a second PSCCH. For example, the first device 100 may receive fourth SCI and second data through the second PSSCH. For example, the first device 100 may determine a second PSFCH resource based on an index of a slot and an index of a subchannel related to the second PSSCH. For example, based on the skipping/omission of the second PSFCH transmission related to the second PSSCH on the second PSFCH resource, a second timer included in the SL DRX configuration may not be started. For example, the second PSFCH may include only a NACK. For example, the second timer may include at least one of an SL DRX HARQ RTT timer and an SL DRX retransmission timer.

For example, the second timer may be started based on the transmission of the third PSFCH related to the second data by a third device. For example, the third device may be a device that performs the same group cast communication as the first device.

For example, the ACK may be transmitted based on a reserved resource located after the first timer expires.

For example, decoding of the first PSSCH may be additionally performed on a reserved resource located after the first timer expires. For example, an ACK may be transmitted based on the successful decoding.

For example, the number of reserved resources located after the expiration of the first timer may be configured differently based on at least one of a service type, priority, or congestion in the resource pool.

For example, based on a priority of a third PSFCH transmission overlapping the second PSFCH transmission being higher than a priority of the second PSFCH transmission, the second PSFCH transmission may be skipped/omitted. For example, the second PSFCH transmission and the third PSFCH transmission may be related to a groupcast communication. For example, the number of groupcast members related to the third PSFCH transmission may be greater than the number of groupcast members related to the second PSFCH transmission.

The above-described embodiment may be applied to various devices to be described below. For example, the processor 102 of the first apparatus 100 may obtain a sidelink discontinuous reception (SL DRX) configuration. And, for example, the processor 102 of the first device 100 is configured to control a transceiver 106 to receive first sidelink control information (SCI) for scheduling a first physical sidelink shared channel (PSSCH) through a first physical sidelink control channel (PSCCH) from a second device. And, for example. The processor 102 of the first device 100 is configured to control the transceiver 106 to receive second SCI and first data from the second device through the first PSSCH. The processor 102 of the first device 100 is configured to control the transceiver 106 to receive determine a first physical sidelink feedback channel (PSFCH) resource based on an index of a slot and an index of a subchannel which are related to the first PSSCH. For example. a first timer included in the SL DRX configuration is started based on skipping of a first PSFCH transmission related to the first PSSCH on the first PSFCH resource.

According to an embodiment of the present disclosure, a first device for performing wireless communication may be provided. For example, the first device may include one or more memories for storing instructions; one or more transceivers; and one or more processors connecting the one or more memories and the one or more transceivers. For example, the one or more processors execute the instructions to obtain a sidelink discontinuous reception (SL DRX) configuration; receive first sidelink control information (SCI) for scheduling a first physical sidelink shared channel (PSSCH) through a first physical sidelink control channel (PSCCH) from a second device; and receiving second SCI and first data from the second device through the first PSSCH; and determine a first physical sidelink feedback channel (PSFCH) resource based on an index of a slot and an index of a subchannel which are related to the first PSSCH. For example, a first timer included in the SL DRX configuration is started based on skipping of a first PSFCH transmission related to the first PSSCH on the first PSFCH resource.

According to an embodiment of the present disclosure, an apparatus configured to control the first UE may be provided. For example, one or more processors; and one or more memories operably coupled by the one or more processors and storing instructions. For example, the one or more processors execute the instructions to obtain a sidelink discontinuous reception (SL DRX) configuration; receive first sidelink control information (SCI) for scheduling a first physical sidelink shared channel (PSSCH) through a first physical sidelink control channel (PSCCH) from a second UE; receive second SCI and first data from the second UE through the first PSSCH; and determine a first physical sidelink feedback channel (PSFCH) resource based on an index of a slot and an index of a subchannel which are related to the first PSSCH. For example, wherein a first timer included in the SL DRX configuration is started based on skipping of a first PSFCH transmission related to the first PSSCH on the first PSFCH resource.

According to an embodiment of the present disclosure, a non-transitory computer readable medium (CRM) storing instructions may be provided. For example, the instructions, when executed, cause the first device to: obtain a sidelink discontinuous reception (SL DRX) configuration; receive first sidelink control information (SCI) for scheduling a first physical sidelink shared channel (PSSCH) through a first physical sidelink control channel (PSCCH) from a second device; receive second SCI and first data from the second device through the first PSSCH; and determine a first physical sidelink feedback channel (PSFCH) resource based on an index of a slot and an index of a subchannel which are related to the first PSSCH. For example, a first timer included in the SL DRX configuration is started based on skipping of a first PSFCH transmission related to the first PSSCH on the first PSFCH resource.

Figure 15:
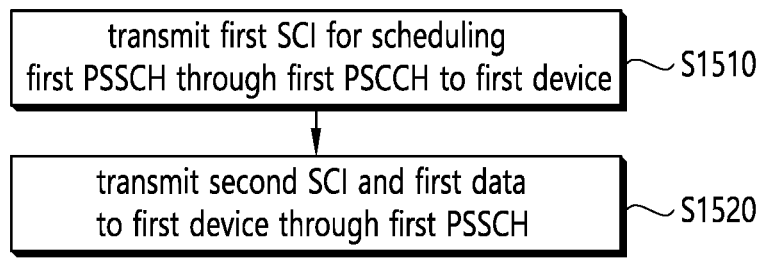
FIG. 15 shows a method for starting an SL DRX timer according to an embodiment of the present disclosure.

FIG. 15 shows a method for starting an SL DRX timer according to an embodiment of the present disclosure. The embodiment of FIG. 15 may be combined with various embodiments of the present disclosure.

Referring to FIG. 15, in step S1510, the second device 200 may transmit first sidelink control information (SCI) for scheduling a first physical sidelink shared channel (PSSCH) through a first physical sidelink control channel (PSCCH) to the first device 100.

In step S1520, the second device 200 may transmit the second SCI and first data to the first device 100 through the first physical sidelink shared channel (PSSCH).

For example, an SL sidelink discontinuous reception (DRX) configuration may be obtained.

For example, a first physical sidelink feedback channel (PSFCH) resource may be determined based on an index of a slot related to the first PSSCH and an index of a subchannel.

For example, based on skipping/omission of the first PSFCH transmission related to the first PSSCH on a first PSFCH resource, a first timer included in the SL DRX configuration may be started.

For example, the first PSFCH may include either an acknowledgment (ACK) or a negative acknowledgment (NACK).

For example, the first timer may include at least one of an SL DRX hybrid automatic repeat request (HARQ) round trip time (RTT) timer or an SL DRX retransmission timer.

For example, the ACK may be transmitted based on a reserved resource located after the first timer expires.

For example, decoding of the first PSSCH may be additionally performed on a reserved resource located after the first timer expires. For example, an ACK may be transmitted based on the successful decoding.

For example, the number of reserved resources located after the expiration of the first timer may be configured differently based on at least one of a service type, priority, or congestion in the resource pool.

The above-described embodiment may be applied to various devices to be described below. First, for example, the processor 202 of the second device 200 may be configured to control the transceiver 206 to transmit first sidelink control information (SCI) for scheduling a first physical sidelink shared channel (PSSCH) through a first physical sidelink control channel (PSCCH) to a first device 100. And, for example, the processor 202 of the second device 200 may be configured to control the transceiver 206 to transmit second SCI and first data to the first device 100 through the first PSSCH.

According to an embodiment of the present disclosure, a second device for performing wireless communication may be provided. For example, the second device may include one or more memories to store instructions; one or more transceivers; and one or more processors connecting the one or more memories and the one or more transceivers. For example, the one or more processors execute the instructions to transmit first sidelink control information (SCI) for scheduling a first physical sidelink shared channel (PSSCH) through a first physical sidelink control channel (PSCCH) to a first device; and transmit second SCI and first data to the first device through the first PSSCH. For example, a sidelink discontinuous reception (SL DRX) configuration is obtained. For example, a first physical sidelink feedback channel (PSFCH) resource is determined based on an index of a slot and an index of a subchannel which are related to the first PSSCH. For example, a first timer included in the SL DRX configuration is started based on skipping of a first PSFCH transmission related to the first PSSCH on the first PSFCH resource.

Various embodiments of the present disclosure may be combined with each other.

Various embodiments of the present disclosure may be implemented independently. Alternatively, various embodiments of the present disclosure may be implemented in combination with or merged with each other. For example, various embodiments of the present disclosure have been described based on the 3GPP system for convenience of description, but various embodiments of the present disclosure may be extendable to systems other than the 3GPP system. For example, various embodiments of the present disclosure are not limited only to direct communication between UEs, and may be used in uplink or downlink, and in this case, a base station or a relay node may use the method proposed according to various embodiments of the present disclosure. For example, information related to whether the method according to various embodiments of the present disclosure is applied may be provided by the base station to the UE or the second device 200 to the receiving UE using a predefined signal (e.g., a physical layer). signal or higher layer signal). For example, information related to rules according to various embodiments of the present disclosure may be defined such that the base station may notify the terminal or the second device 200 to the receiving UE through a pre-defined signal (e.g., a physical layer signal or a higher layer signal).

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
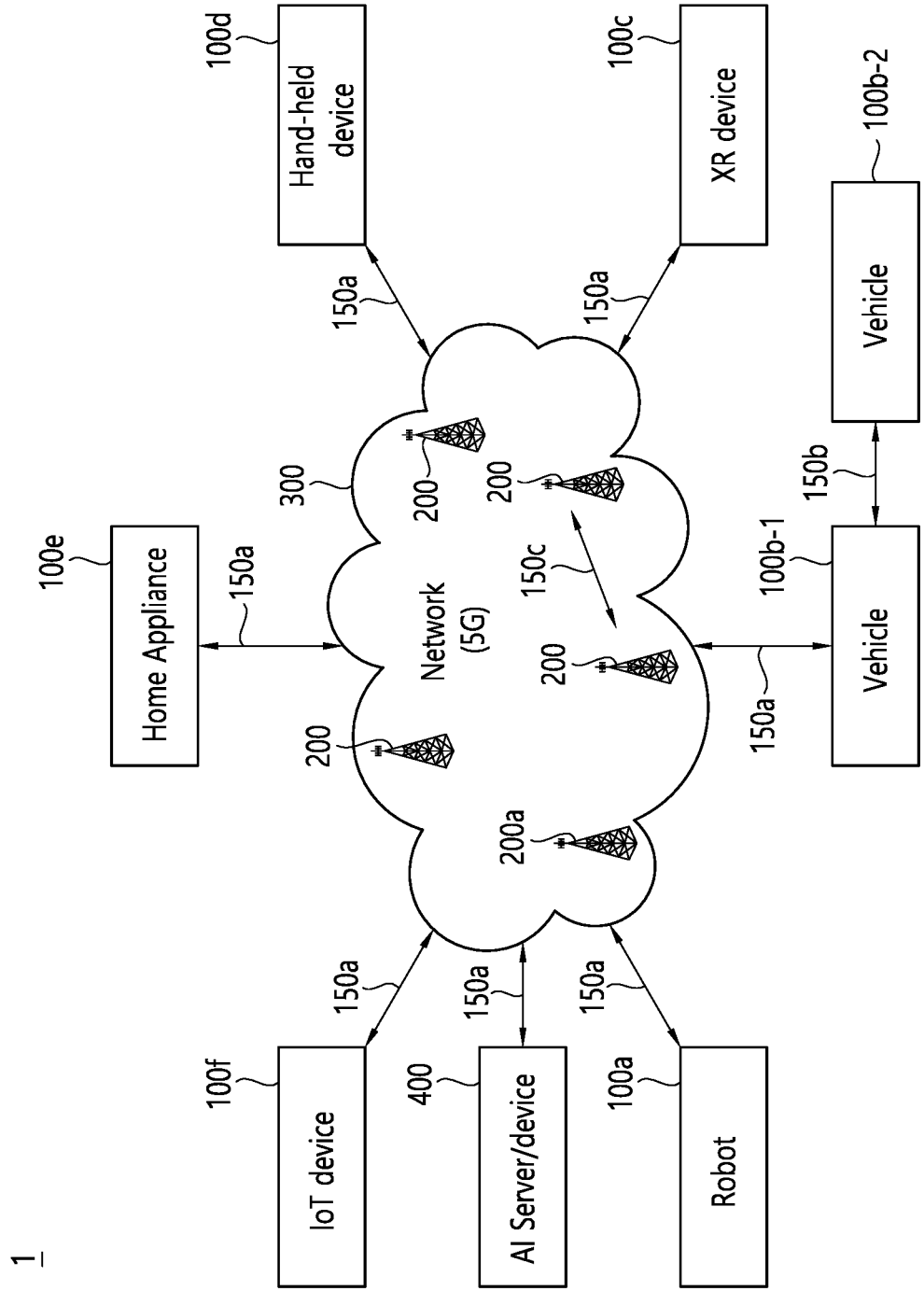
FIG. 16 shows a communication system 1, based on an embodiment of the present disclosure.

FIG. 16 shows a communication system 1, based on an embodiment of the present disclosure. The embodiment of FIG. 16 may be combined with various embodiments of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
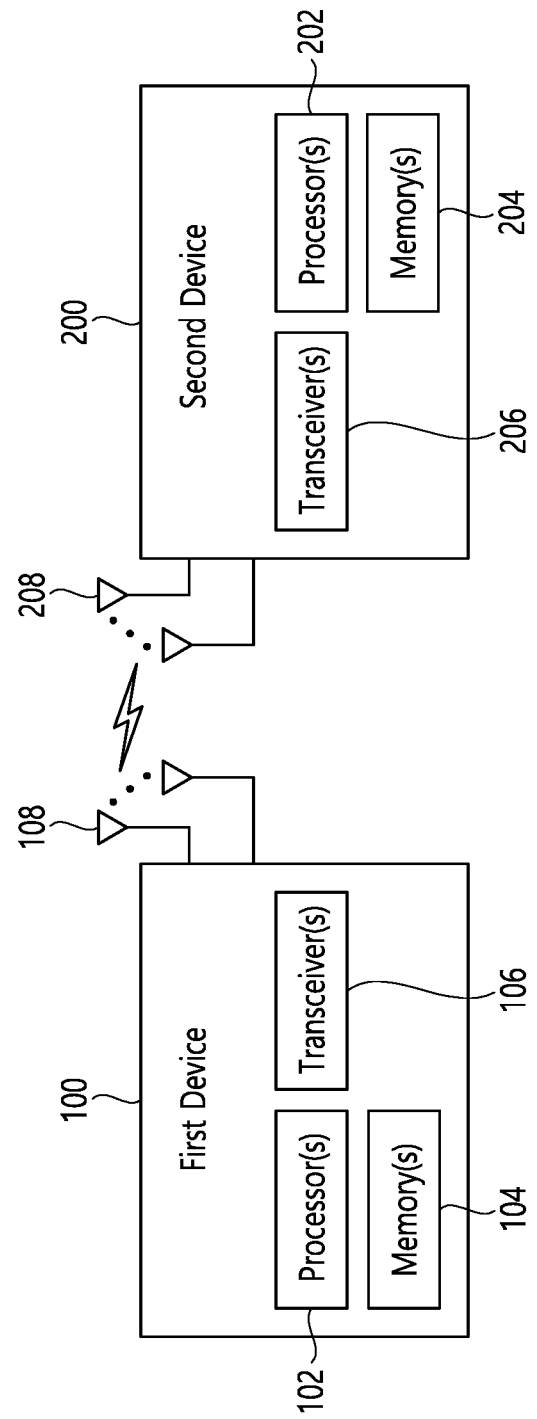
FIG. 17 shows wireless devices, based on an embodiment of the present disclosure.

FIG. 17 shows wireless devices, based on an embodiment of the present disclosure. The embodiment of FIG. 17 may be combined with various embodiments of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
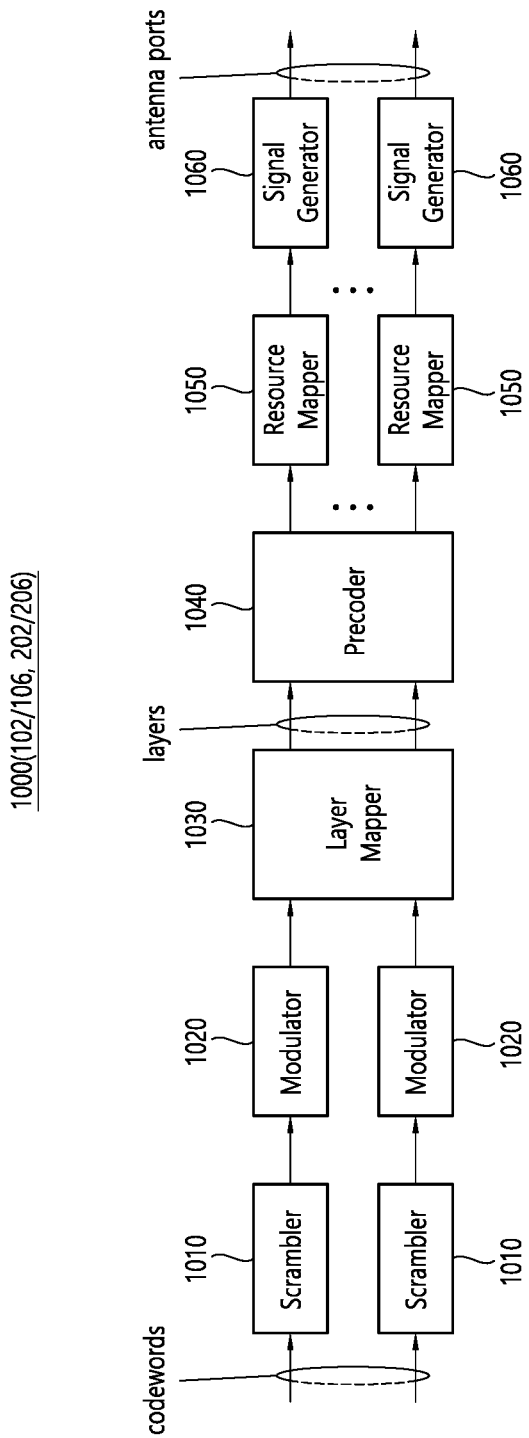
FIG. 18 shows a signal process circuit for a transmission signal, based on an embodiment of the present disclosure.

FIG. 18 shows a signal process circuit for a transmission signal, based on an embodiment of the present disclosure. The embodiment of FIG. 18 may be combined with various embodiments of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
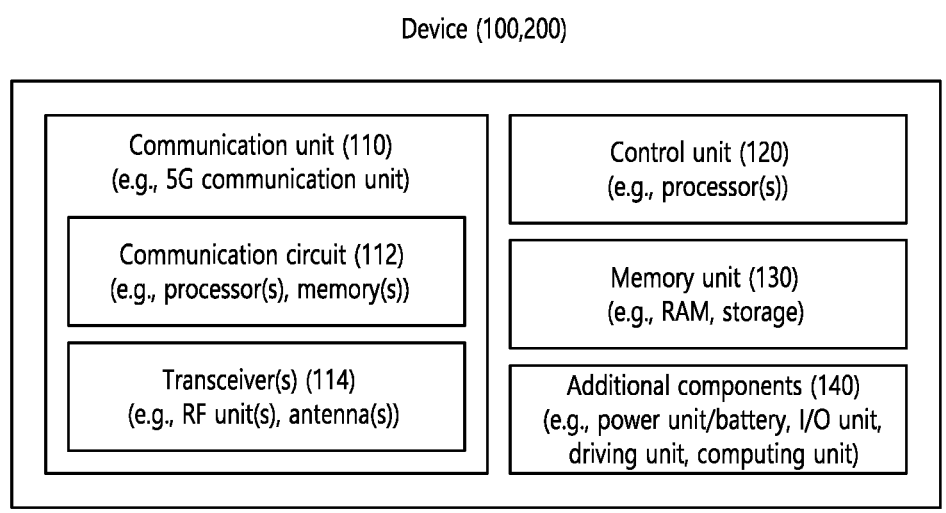
FIG. 19 shows another example of a wireless device, based on an embodiment of the present disclosure.

FIG. 19 shows another example of a wireless device, based on an embodiment of the present disclosure. The wireless device may be implemented in various forms according to a use-case/service (refer to FIG. 16). The embodiment of FIG. 19 may be combined with various embodiments of the present disclosure.

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 16), the vehicles (100*b*-1 and 100*b*-2 of FIG. 16), the XR device (100*c* of FIG. 16), the hand-held device (100*d* of FIG. 16), the home appliance (100*e* of FIG. 16), the IoT device (100*f* of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
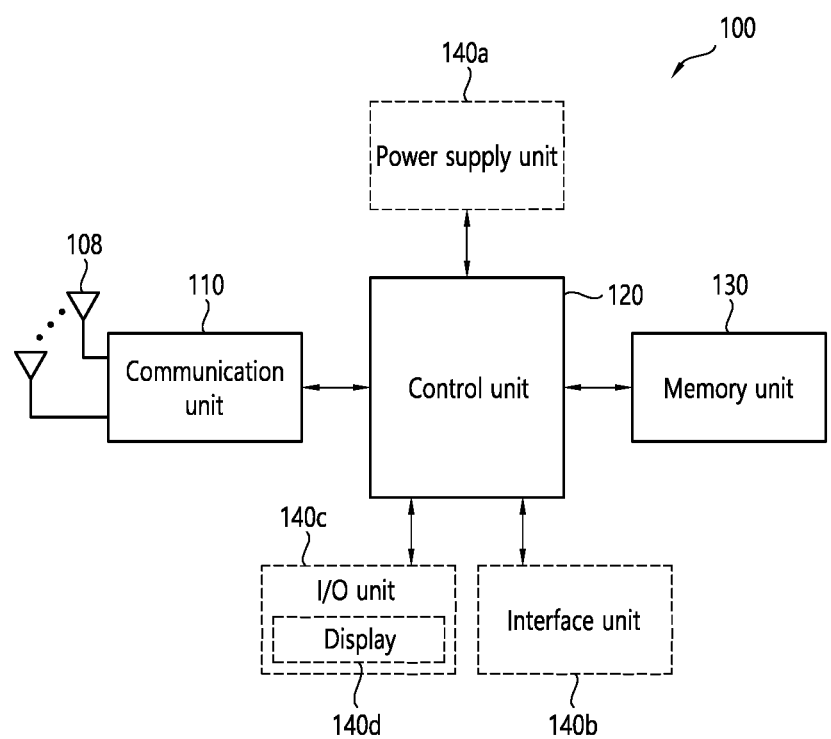
FIG. 20 shows a hand-held device, based on an embodiment of the present disclosure.

FIG. 20 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 20 may be combined with various embodiments of the present disclosure.

Referring to FIG. 20, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 21:
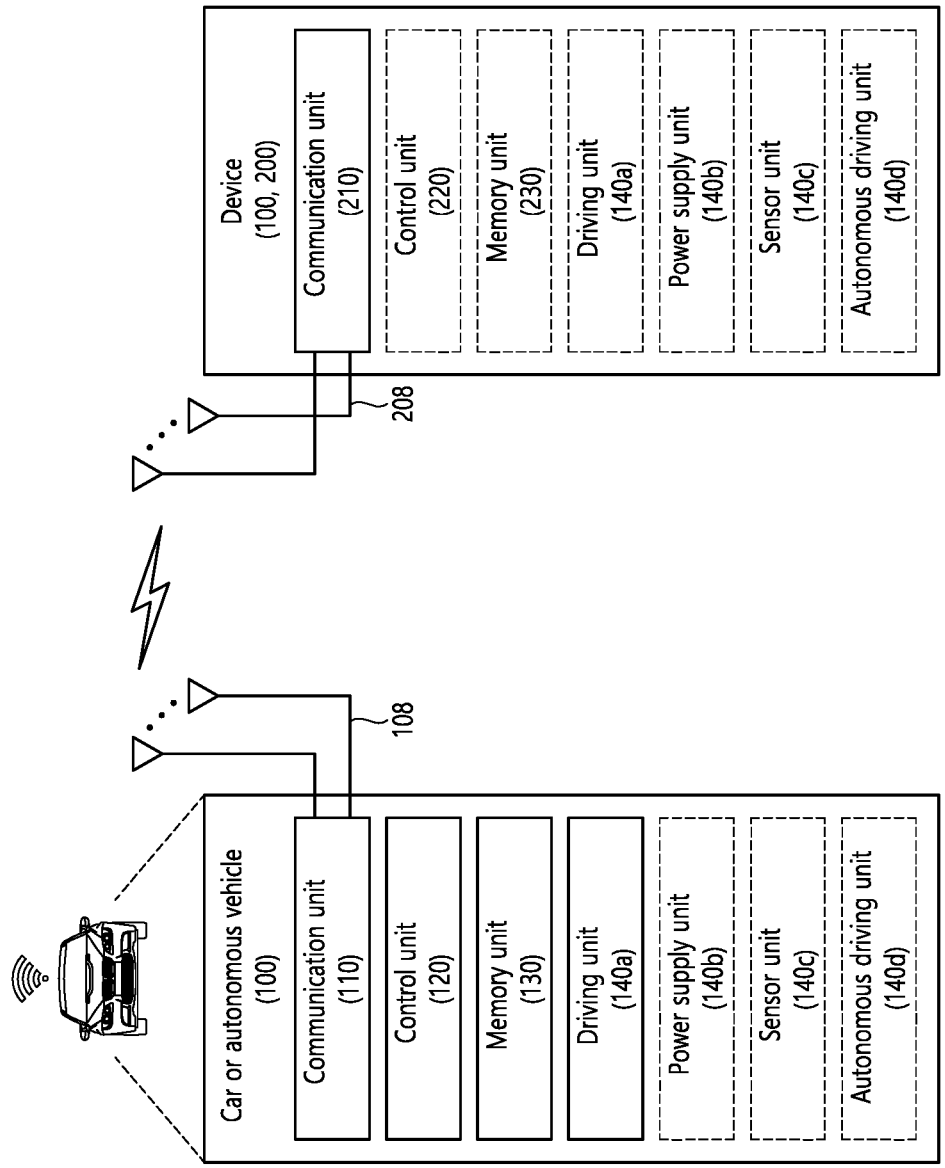
FIG. 21 shows a vehicle or an autonomous vehicle, based on an embodiment of the present disclosure.

FIG. 21 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 21 may be combined with various embodiments of the present disclosure.

Referring to FIG. 21, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
    obtaining a sidelink (SL) discontinuous reception (DRX) configuration including information related to a first SL DRX timer;
    receiving, from a second device through a first physical sidelink control channel (PSCCH), first sidelink control information (SCI) for scheduling of a first physical sidelink shared channel (PSSCH) and second SCI;
    receiving, from the second device through the first PSSCH, the second SCI and first data; and
    determining a first physical sidelink feedback channel (PSFCH) resource related to the first PSSCH,
    wherein the first SL DRX timer is started based on that first SL hybrid automatic repeat request (HARQ) feedback is not transmitted on the first PSFCH resource.

2. The method of claim 1, wherein the first SL HARQ feedback includes either an acknowledgment (ACK), or a negative acknowledgment (NACK).

3. The method of claim 1, wherein the first SL DRX timer includes at least one of an SL DRX HARQ round trip time (RTT) timer, or an SL DRX retransmission timer.

4. The method of claim 1, further comprising:
    receiving, through a second PSCCH, third SCI for scheduling of a second PSSCH and fourth SCI;
    receiving, through the second PSCCH, the fourth SCI and second data, and
    determining a second PSFCH resource related to the second PSSCH,
    wherein a second SL DRX timer is not started based on that second SL HARQ feedback is not transmitted on the second PSFCH resource.

5. The method of claim 4, wherein the second SL HARQ feedback includes only a negative acknowledgment (NACK).

6. The method of claim 4, wherein the second SL DRX timer includes at least one of an SL DRX HARQ round trip time (RTT) timer, or an SL DRX retransmission timer.

7. The method of claim 4, wherein the second SL DRX timer is started based on third SL HARQ feedback related to the second data being transmitted by a third device,
    wherein the third device is a device performing same group cast communication as the first device.

8. The method of claim 1, wherein an acknowledgment (ACK) is transmitted based on a reserved resource located after the first SL DRX timer expires.

9. The method of claim 1, wherein decoding of the first PSSCH is additionally performed on a reserved resource located after the first SL DRX timer expires.

10. The method of claim 9, wherein an acknowledgment (ACK) is transmitted based on the decoding being successful.

11. The method of claim 1, wherein a number of reserved resources located after the first SL DRX timer expires is configured differently based on at least one of a service type, priority, or congestion in a resource pool.

12. The method of claim 4, wherein, based on that a priority of PSFCH transmission with third SL HARQ feedback overlapping PSFCH transmission with the second SL HARQ feedback is higher than a priority of the PSFCH transmission with the second SL HARQ feedback, the PSFCH transmission with the second SL HARQ feedback is not transmitted.

13. The method of claim 12, wherein the PSFCH transmission with the second SL HARQ feedback and the PSFCH transmission with the third SL HARQ feedback are related to groupcast communication, and wherein a number of groupcast members related to the PSFCH transmission with the third SL HARQ feedback is greater than a number of groupcast members related to the PSFCH transmission with the second SL HARQ feedback.

14. A first device adapted to perform wireless communication, the first device comprising:
    at least one transceiver;
    at least one processor; and
    at least one memory connected to the at least one processor and storing instructions that, based on being executed, cause the at least one processor to perform operations comprising:
    obtaining a sidelink (SL) discontinuous reception (DRX) configuration including information related to a first SL DRX timer;
    receiving, from a second device through a first physical sidelink control channel (PSCCH), first sidelink control information (SCI) for scheduling of a first physical sidelink shared channel (PSSCH) and second SCI;
    receiving, from the second device through the first PSSCH, the second SCI and first data, and
    determining a first physical sidelink feedback channel (PSFCH) resource related to the first PSSCH,
    wherein the first SL DRX timer is started based on that first SL hybrid automatic repeat request (HARQ) feedback is not transmitted on the first PSFCH resource.

15. The first device of claim 14, wherein the first SL HARQ feedback includes either an acknowledgment (ACK), or a negative acknowledgment (NACK).

16. The first device of claim 14, wherein the first SL DRX timer includes at least one of an SL DRX HARQ round trip time (RTT) timer, or an SL DRX retransmission timer.

17. A processing device adapted to control a first device, the processing device comprising:
- at least one processor; and
- at least one memory connected to the at least one processor and storing instructions that, based on being executed, cause the at least one processor to perform operations comprising:
- obtaining a sidelink (SL) discontinuous reception (DRX) configuration including information related to a first SL DRX timer;
- receiving, from a second device through a first physical sidelink control channel (PSCCH), first sidelink control information (SCI) for scheduling of a first physical sidelink shared channel (PSSCH) and second SCI;
- receiving, from the second device through the first PSSCH, the second SCI and first data; and
- determining a first physical sidelink feedback channel (PSFCH) resource related to the first PSSCH,
- wherein the first SL DRX timer is started based on that first SL hybrid automatic repeat request (HARQ) feedback is not transmitted on the first PSFCH resource.

18. The processing device of claim 17, wherein the first SL HARQ feedback includes either an acknowledgment (ACK), or a negative acknowledgment (NACK).

19. The processing device of claim 17, wherein the first SL DRX timer includes at least one of an SL DRX HARQ round trip time (RTT) timer, or an SL DRX retransmission timer.

\* \* \* \* \*